US012649646B2

(12) United States Patent　(10) Patent No.: US 12,649,646 B2

Yamamoto　(45) Date of Patent: Jun. 9, 2026

(54) SHOVEL AND INFORMATION PROCESSING DEVICE

(71) Applicant: SUMITOMO HEAVY INDUSTRIES, LTD., Tokyo (JP)

(72) Inventor: Yasuhiro Yamamoto, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 126 days.

(21) Appl. No.: 18/364,807

(22) Filed: Aug. 3, 2023

(65) Prior Publication Data

US 2024/0017970 A1　Jan. 18, 2024

Related U.S. Application Data

(63) Continuation of application No. PCT/JP2022/005479, filed on Feb. 10, 2022.

(30) Foreign Application Priority Data

Feb. 19, 2021　(JP) ................................. 2021-025522

(51) Int. Cl.
　*B66C 23/58*　(2006.01)
　*B66C 13/06*　(2006.01)
　(Continued)

(52) U.S. Cl.
　CPC .......... *B66C 23/585* (2013.01); *B66C 13/063* (2013.01); *B66C 13/48* (2013.01);
　(Continued)

(58) Field of Classification Search
　CPC .................................................... G06V 20/58
　See application file for complete search history.

(56) References Cited

U.S. PATENT DOCUMENTS 8,960,461 B2 * 2/2015 Kakeya ................... B66C 23/74
　　　　　　　　　　　　　　　　701/41
11,679,961 B2 * 6/2023 Palberg ................... E02F 9/264
　　　　　　　　　　　　　　　　701/3

(Continued)

FOREIGN PATENT DOCUMENTS

AU　　2015233875 A1 * 10/2016 ............. B66C 13/16
EP　　　3323767 A1 * 5/2018 ............. B66C 13/46
　(Continued)

OTHER PUBLICATIONS

Machine translation of WO 2021193919 A1 (Year: 2021).*

(Continued)

*Primary Examiner* — Kenneth M Dunne
(74) *Attorney, Agent, or Firm* — IPUSA, PLLC

(57) ABSTRACT

A work machine includes a lower traveling body, an upper swing body swingably mounted on the lower traveling body, a work device attached to the upper swing body, a hook attached to the distal end of the work device, an acquisition device configured to acquire information on the conveying destination of a suspended load to be suspended from the hook, and an imaging device attached to the upper swing body and configured to acquire image information related to a situation in an area in front of, behind, and beside the upper swing body. The situation includes the state of the suspended load. The work machine is configured to automatically convey the suspended load to the conveying destination by causing at least one of the lower traveling body, the upper swing body, and the work device to operate.

18 Claims, 14 Drawing Sheets

(51) Int. Cl.

| | |
|---|---|
| *B66C 13/48* | (2006.01) |
| *B66C 13/54* | (2006.01) |
| *B66C 23/36* | (2006.01) |
| *B66C 23/90* | (2006.01) |
| *E02F 3/43* | (2006.01) |
| *E02F 3/96* | (2006.01) |
| *E02F 9/20* | (2006.01) |
| *E02F 9/26* | (2006.01) |
| *G05D 1/00* | (2024.01) |
| *G06V 20/58* | (2022.01) |
| *E02F 9/16* | (2006.01) |
| *E02F 9/22* | (2006.01) |

(52) U.S. Cl.

CPC ............ *B66C 23/36* (2013.01); *B66C 23/905* (2013.01); *E02F 3/439* (2013.01); *E02F 3/964* (2013.01); *E02F 9/2033* (2013.01); *E02F 9/262* (2013.01); *G05D 1/0016* (2013.01); *G05D 1/0214* (2013.01); *G05D 1/0246* (2013.01); *B66C 13/54* (2013.01); *E02F 9/16* (2013.01); *E02F 9/2228* (2013.01); *E02F 9/2285* (2013.01); *E02F 9/2292* (2013.01); *E02F 9/2296* (2013.01); *G06V 20/58* (2022.01)

(56) References Cited

U.S. PATENT DOCUMENTS

| | | | | |
|---|---|---|---|---|
| 12,474,707 | B2 * | 11/2025 | Sasaoka ................... | G05D 1/43 |
| 2011/0276261 | A1 * | 11/2011 | Mizutani ................. | B66C 13/18 |
| | | | | 701/123 |

| | | | | |
|---|---|---|---|---|
| 2014/0019016 | A1 * | 1/2014 | Miyoshi ................ | B66C 23/905 |
| | | | | 701/50 |
| 2020/0149248 | A1 * | 5/2020 | Ram-On ................ | E01C 19/004 |
| 2020/0307965 | A1 * | 10/2020 | Pinel ........................ | B66C 13/46 |
| 2020/0340208 | A1 | 10/2020 | Kitajima et al. | |
| 2021/0206605 | A1 * | 7/2021 | Rotem .................. | B66C 13/063 |
| 2022/0089417 | A1 * | 3/2022 | Ladra ...................... | B66C 15/04 |
| 2023/0145087 | A1 * | 5/2023 | Span ....................... | B66C 13/46 |
| | | | | 212/276 |

FOREIGN PATENT DOCUMENTS

| | | | | | |
|---|---|---|---|---|---|
| EP | | 3416015 | A1 * | 12/2018 | ........... B64C 39/024 |
| JP | | H10-17271 | | 1/1998 | |
| JP | | 2000-064336 | | 2/2000 | |
| JP | | 2000-226862 | | 8/2000 | |
| JP | | 2018-095370 | | 6/2018 | |
| JP | | 2019-148912 | | 9/2019 | |
| JP | | 2020-152473 | | 9/2020 | |
| WO | | WO-2015045521 | A1 * | 4/2015 | ............ B66C 13/48 |
| WO | | 2019/139102 | | 7/2019 | |
| WO | | WO-2021193919 | A1 * | 9/2021 | ........... B64C 39/024 |

OTHER PUBLICATIONS

Machine translation of WO-2015045521-A1 (Year: 2015).*

Machine translation of WO2019139102A1 with paragraph numbering, espacenet (Year: 2019).*

International Search Report for PCT/JP2022/005479 mailed on May 10, 2022.

* cited by examiner

SYS

SHOVEL AND INFORMATION PROCESSING DEVICE

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2022/005479, filed on Feb. 10, 2022 and designating the U.S., which claims priority to Japanese Patent Application No. 2021-025522, filed on Feb. 19, 2021. The entire contents of the foregoing applications are incorporated herein by reference.

BACKGROUND

Technical Field

The present disclosure relates to shovels and the like.

Description of Related Art

For example, a technology for supporting a lifting work (crane work) by a work machine such as a shovel by keeping the height of a suspended load constant or keeping the lifting or lowering of the suspended load on a vertical line is known.

SUMMARY

According to an aspect of the present disclosure, a work machine includes a lower traveling body, an upper swing body swingably mounted on the lower traveling body, a work device attached to the upper swing body, a hook attached to the distal end of the work device, an acquisition device configured to acquire information on the conveying destination of a suspended load to be suspended from the hook, and an imaging device attached to the upper swing body and configured to acquire image information related to a situation in an area in front of, behind, and beside the upper swing body. The situation includes the state of the suspended load. The work machine is configured to automatically convey the suspended load to the conveying destination by causing at least one of the lower traveling body, the upper swing body, and the work device to operate.

DETAILED DESCRIPTION

In a lifting work performed by a work machine such as a shovel, when a suspended load is conveyed to a conveying destination, operations other than vertically moving the suspended load or moving the suspended load while maintaining a constant height may be performed. Therefore, there is a demand for a technique capable of comprehensively supporting lifting work for conveying a suspended load to a conveying destination.

According to an aspect of the present disclosure, a technique capable of comprehensively supporting lifting work of a work machine such as a shovel that conveys a suspended load to a conveying destination is provided.

An embodiment is described below with reference to the accompanying drawings.

Overview of Work Machine Management System

First, an overview of a work machine management system SYS according to the present embodiment will be described with reference to FIG. 1 to FIG. 3.

Figure 1:
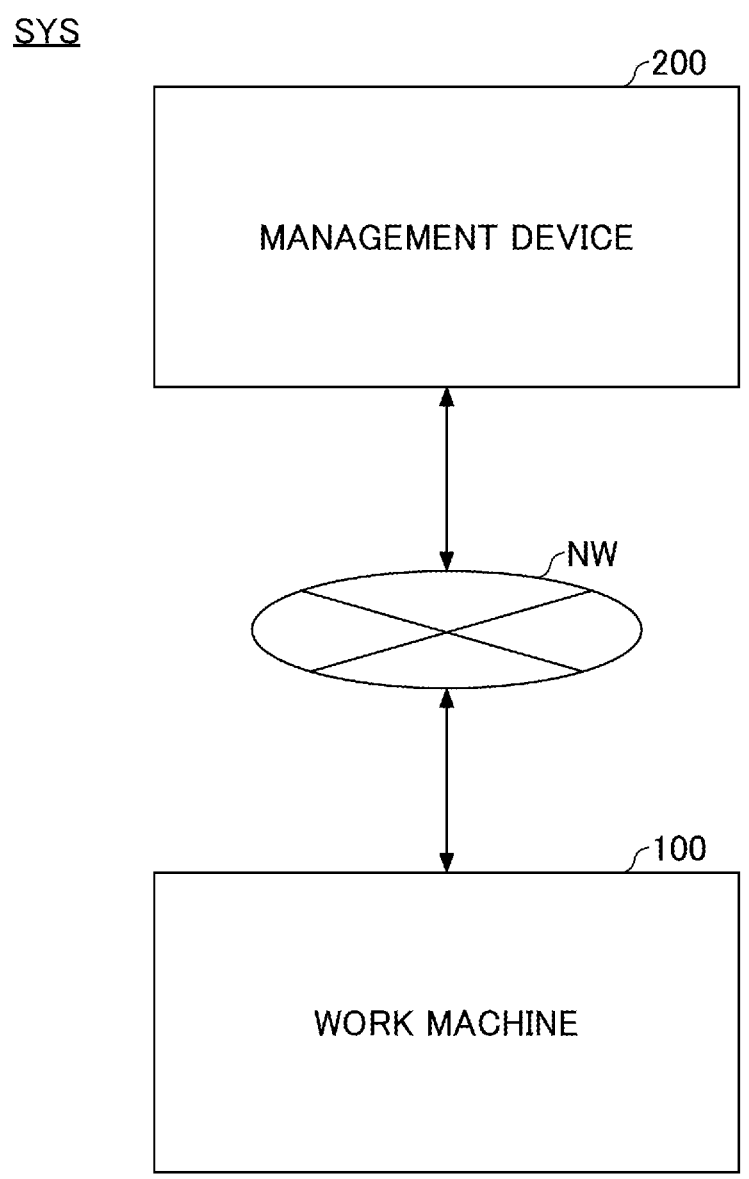
FIG. 1 is a schematic diagram illustrating an example of a work machine management system.

FIG. 1 is a schematic diagram illustrating an example of a work machine management system SYS according to the present embodiment. FIG. 2 and FIG. 3 are diagrams illustrating specific examples of a work machine 100 included in the work machine management system SYS. Specifically, FIG. 2 is a diagram illustrating an example of a shovel 100A, and FIG. 3 is a diagram illustrating an example of a crawler crane 100B. Corresponding components (for example, components having the same function) of the shovel 100A and the crawler crane 100B are denoted by the same reference numerals in the following description.

As illustrated in FIG. 1, the work machine management system SYS includes the work machine 100 and a management device 200.

The work machine management system SYS may include one or more of work machines 100. When the work machines 100 are included in the work machine management system SYS, all of the work machines 100 may be of the same type, or at least some of the work machines 100 may be of different types. For example, the work machine management system SYS may include the shovels 100A or crawler cranes 100B described later, or may include one or more of the shovels 100A and one or more of the crawler cranes 100B.

Similarly, the work machine management system SYS may include multiple management devices 200. That is, the management devices 200 may perform processing related to the work machine management system SYS in a distributed manner. For example, each of the management devices 200 may mutually communicate with some of the work machines 100 being managed among all the work machines 100 included in the work machine management system SYS, and may execute processing for the work machines 100 being managed among all the work machines 100.

In the work machine management system SYS, for example, the management device 200 collects information from the work machine 100 and monitors various situations of the work machine 100 (for example, presence or absence of abnormality of various devices mounted on the work machine 100).

Furthermore, in the work machine management system SYS, the management device 200 may support remote operation of the work machine 100, for example.

As will be described later, when the work machine 100 works fully automatically, in the work machine management system SYS, the management device 200 may support remote monitoring of the work of the work machine 100 that is operated fully automatically, for example.

<Overview of Work Machine>

The work machine 100 includes a lower traveling body 1, an upper swing body 3 swingably mounted on the lower traveling body 1 via a swing mechanism 2, an attachment AT attached to the upper swing body 3, a hook HK provided at the distal end of the attachment AT, and a cabin 10 in which an operator rides. Hereinafter, the front side of the work machine 100 (upper swing body 3) corresponds to the direction in which the attachment to the upper swing body 3 extends when the shovel 100A is viewed in a plan view (top view) from right above along the rotation axis of the upper swing body 3. Also, the left side and the right side of the work machine 100 (the upper swing body 3) respectively correspond to the left side and the right side viewed from the operator seated on the operator's seat in the cabin 10.

As will be described later, the cabin 10 may be omitted when the work machine 100 is remotely operated or when the work machine 100 is operated fully automatically.

The work machine 100 can perform crane work (lifting work) for conveying a suspended load SL to a predetermined conveying destination by suspending the suspended load SL on the hook HK and causing at least one of the lower traveling body 1, the upper swing body 3, and the attachment AT to operate.

The work machine 100 is also equipped with a communication device 60 and can communicate with the management device 200 through a predetermined communication line NW. Accordingly, the work machine 100 can transmit (upload) various types of information to the management device 200 and receive various types of signals (for example, an information signal and a control signal) and the like from the management device 200.

The communication line NW includes, for example, a wide area network (WAN). The wide area network may include, for example, a mobile communication network whose terminals are base stations. The wide area network may also include, for example, a satellite communication network utilizing communication satellites above the work machine 100. The wide area network may also include, for example, the Internet. The communication line NW may include, for example, a local area network (LAN) of a facility or the like in which the management device 200 is installed. The local network may be a wireless line, a wired line, or a line that includes both. The communication line NW may also include, for example, a short distance communication line based on a predetermined wireless communication system such as WiFi or Bluetooth (registered trademark).

The work machine 100 causes an actuator (for example, a hydraulic actuator) to operate in response to an operator's operation of the operator in the cabin 10, and drives driven elements such as the lower traveling body 1, the upper swing body 3, and the attachment AT.

Furthermore, the work machine 100 may also be configured such that the operator in the cabin 10 can operate the work machine 100, or can be alternatively or additionally remotely operated (remote operation) from outside of the work machine 100. When the work machine 100 is remotely operated, the interior of the cabin 10 may be unmanned. Hereinafter, description will be given on the premise that at least one from among the operation on an operation device 26 in the cabin 10 by the operator and the remote operation by an external operator is included in the operator's operation.

The remote operation includes, for example, a mode in which the work machine 100 is operated in response to an input by the user (operator) to a predetermined external device (for example, the management device 200) for activating the actuator of the work machine 100. In this case, for example, the work machine 100 may transmit image information (hereinafter, "peripheral image") of the periphery of the work machine 100 based on the output of an imaging device S6 described later to the external device, and the image information may be displayed on a display device (hereinafter, "remote operation display device") provided on the external device. Various information images (information screens) displayed on an output device 50 (display device) in the cabin 10 of the work machine 100 may also be displayed on the remote operation display device of the external device. Accordingly, the operator of the external device can remotely operate the work machine 100 while ascertaining the display contents of the peripheral image representing the periphery of the work machine 100 or various information images displayed on the remote operation display device, for example. The work machine 100 may cause the actuator to operate in response to a remote operation signal indicating the contents of the remote operation received from the external device, and drive the driven elements such as the lower traveling body 1, the upper swing body 3, and the attachment AT.

The remote operation may also include, for example, a mode in which the work machine 100 is operated by a sound input, a gesture input, or the like to the work machine 100 from a person (for example, a worker) around the work machine 100. Specifically, the work machine 100 recognizes a voice uttered by a nearby worker or a gesture performed by a worker or the like, through a sound input device (for example, a microphone), the imaging device, or the like mounted on the work machine 100 (own machine). The work machine 100 may then cause the actuator to operate according to the contents of the recognized voice, gesture, or the like to drive the driven elements such as the lower traveling body 1, the upper swing body 3, and the attachment AT.

The work machine 100 may also cause the actuator to operate automatically regardless of the contents of the operator's operation. Accordingly, the work machine 100 provides a function to cause at least a part of the driven elements such as the lower traveling body 1, the upper swing body 3, and the attachment AT to operate automatically. That is, what is known as "automatic driving function" or "machine control (MC) function" is provided.

The automatic driving function may include a function for automatically operating driven elements (actuators) other than the driven element (actuator) to be operated in response to operation or remote operation on the operation device 26 by the operator. That is, what is known as "semi-automatic driving function" or "operation-assisted MC function" may be included. The automatic driving function may also include a function that automatically causes at least some of the driven elements (hydraulic actuators) to operate without any operation or remote operation on the operation device 26 by the operator. That is, what is known as "fully automatic driving function" or "fully automatic MC function" may be included. When the fully automatic driving function is enabled in the work machine 100, the interior of the cabin 10 may be unmanned. The semi-automatic driving function, the fully automatic driving function, or the like may include a mode in which the operation contents of the driven element (actuator) that is subject to the automatic driving is automatically determined according to a predetermined rule. Furthermore, the semi-automatic driving function, the fully automatic driving function, or the like may include a mode (what is known as "autonomous driving function") in which the work machine 100 autonomously makes various determinations and the operation contents of the driven element (hydraulic actuator) that is subject to the automatic driving is autonomously determined according to the determination result.

The work machine 100 is, for example, a shovel 100A.

Figure 2:
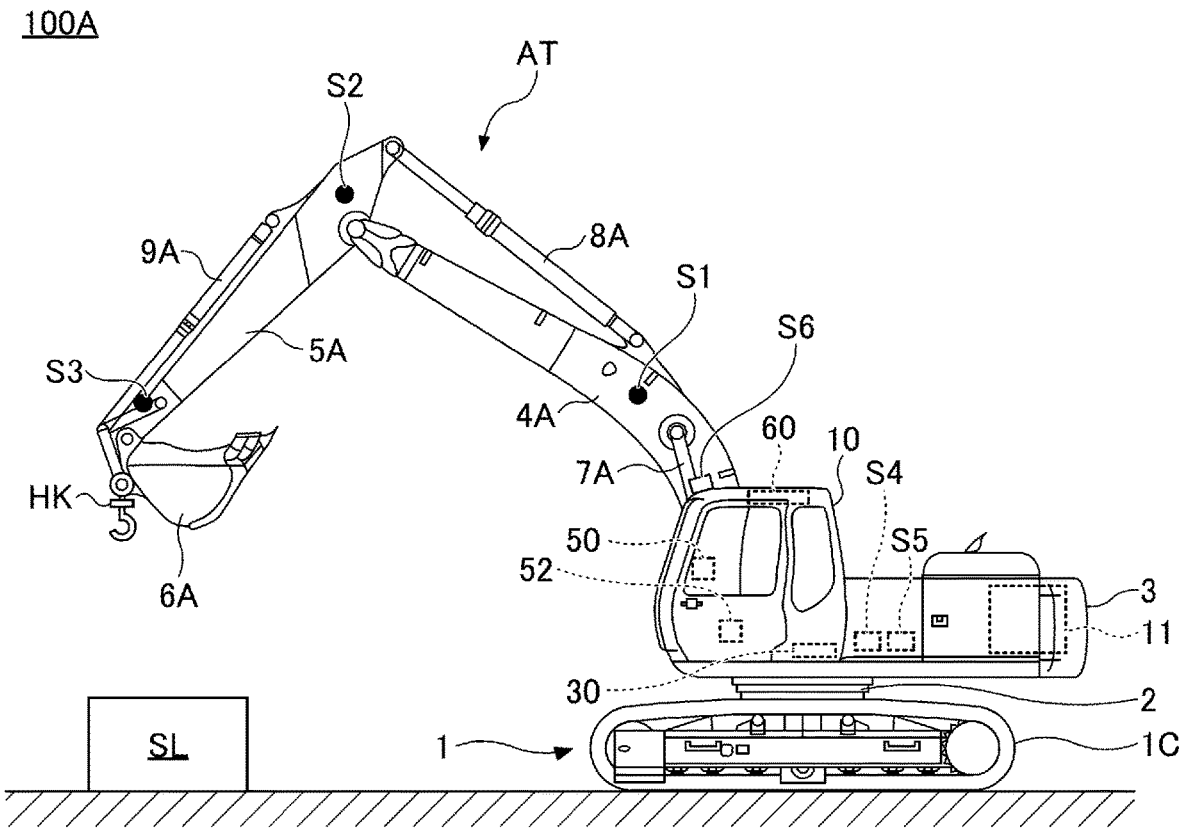
FIG. 2 is a view illustrating an example of a shovel.
Figure 3:
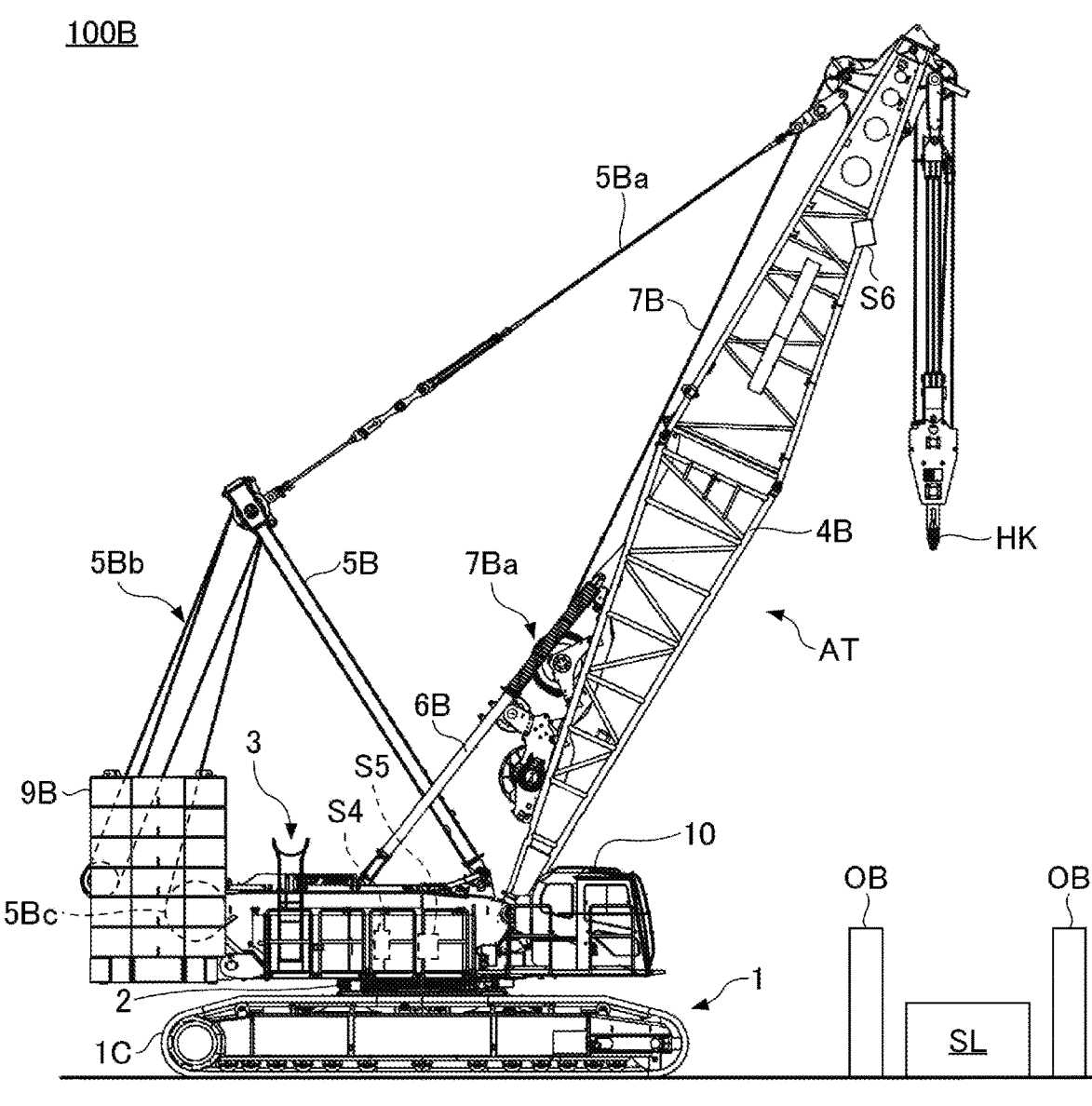
FIG. 3 is a view illustrating an example of a crawler crane.

As illustrated in FIG. 2, a shovel 100A includes a lower traveling body 1, an upper swing body 3 swingably mounted on the lower traveling body 1 via a swing mechanism 2, an attachment AT that performs various kinds of work, and a cabin 10.

The lower traveling body 1 includes, for example, a pair of left and right crawlers 1C. In the lower traveling body 1, the left crawler 1C and the right crawler 1C are hydraulically driven by a left traveling hydraulic motor 1ML and a right traveling hydraulic motor 1MR (see FIG. 6), respectively, thereby causing the shovel 100A to travel.

The swing mechanism 2 is hydraulically driven by a swing hydraulic motor 2M (see FIG. 6), whereby the upper swing body 3 swings with respect to the lower traveling body 1.

The attachment AT (an example of the work device) includes a boom 4A, an arm 5A, and a bucket 6A as driven elements.

The boom 4A is attached to the front center of the upper swing body 3 to be able to move vertically, the arm 5A is attached to the distal end of the boom 4A to be able to pivot vertically, and the bucket 6A is attached to the distal end of the arm 5A to be able to pivot vertically.

The bucket 6A is an example of an end attachment. The bucket 6A is used for excavation work or the like, for example. Instead of the bucket 6A, another end attachment may be attached to the distal end of the arm 5A depending on the work content or the like. The other end attachment may be another type of bucket such as, for example, a large bucket, a slope finishing bucket, a dredging bucket, or the like. In addition, the other end attachment may be an end attachment of a type other than a bucket, such as an agitator, a breaker, or a grapple.

The hook HK for crane work is attached to the bucket 6A. The hook HK is rotatably coupled to a bucket pin that couples the arm 5A and the bucket 6A. Accordingly, the hook HK is stored in a space formed between the two bucket links when work other than crane work (lifting work) such as excavation work or the like is performed.

The boom 4A, the arm 5A, and the bucket 6A are hydraulically driven by a boom cylinder 7A, an arm cylinder 8A, and a bucket cylinder 9A, respectively, serving as hydraulic actuators.

The cabin 10 is an operation room in which the operator rides, and is mounted on the front left side of the upper swing body 3, for example.

The work machine 100 is, for example, a crawler crane 100B.

A crawler crane 100B includes a lower traveling body 1, an upper swing body 3 swingably mounted on the lower traveling body 1 via a swing mechanism 2, an attachment AT, a mast 5B, a backstop 6B, a hook HK, a counterweight 9B, and a cabin 10.

The lower traveling body 1 includes, for example, a pair of left and right crawlers 1C. In the lower traveling body 1, the left crawler 1C and the right crawler 1C are hydraulically driven by a left traveling hydraulic motor 1ML and a right traveling hydraulic motor 1MR (see FIG. 7), respectively, thereby causing crawler crane 100B to travel.

The swing mechanism 2 is hydraulically driven by a swing hydraulic motor 2M (see FIG. 7), whereby the upper swing body 3 swings with respect to the lower traveling body 1.

The attachment AT (an example of the work device) includes a boom 4B and a main winding rope 7B.

The boom 4B is attached to a front center of the upper swing body 3 to be able to be raised and lowered. The main winding rope 7B is suspended from the distal end of the boom 4B, and the hook HK is attached to the distal portion of the main winding rope 7B. That is, the hook HK is attached to the distal portion of the boom 4B via the main winding rope 7B.

The base end of the main winding rope 7B is attached to a main winding winch 7Ba attached to the rear surface portion between the base end and the distal portion of the boom 4B, and the distal portion of the main winding rope 7B is attached to the hook HK. The hook HK can be moved up and down by winding and unwinding the main winding rope 7B by the main winding winch 7Ba that is hydraulically driven by a main winding hydraulic motor 7M (see FIG. 7).

The mast 5B is attached to the upper swing body 3 at a position slightly rearward of the base end of the boom 4B in such a manner as to be rotatable about the rotation axis parallel to the rotation axis of the boom 4B. The distal end portion of the mast 5B is connected to the distal end portion of the boom 4B via a pendant rope 5Ba, and the boom 4B is raised and lowered via the mast 5B by winding and unwinding of a boom derricking rope 5Bb by a boom derricking winch 5Bc that is hydraulically driven by a derricking hydraulic motor 5M (see FIG. 7).

The base end of the backstop 6B is attached to the upper swing body 3 at a position rearward of the base end of the boom 4B in such a manner as to be rotatable about the rotation axis parallel to the rotation axis of the boom 4B, and the distal end of the backstop 6B is attached to the rear surface portion between the base end and the distal portion of the boom 4B in such a manner as to be rotatable about the rotation axis parallel to the rotation axis of the boom 4B. The backstop 6B extends and retracts in accordance with the raising and lowering operation of the boom 4B, and has a function to support the boom 4B from the back side when the boom 4B is in a substantially upright state, for example.

The hook HK is attached to the distal end of the main winding rope 7B and is used to suspend a suspended load SL.

The counterweight 9B is provided at the rear end portion of the upper swing body 3, and has a function to balance the weight of the boom 4B and the suspended load SL.

The cabin 10 is mounted on, for example, the front right end portion of the upper swing body 3. In the cabin 10, an operator's seat and an operation device 26 for operating various actuators (see FIG. 7) are provided.

<Overview of Management Device>

The management device 200 performs management related to the work machine 100, such as management (monitoring) of a state of the work machine 100 and management (monitoring) of work of the work machine 100.

The management device 200 may be, for example, an on-premise server or a cloud server located at a management center or the like outside the worksite of the work machine 100. The management device 200 may also be, for example, an edge server installed within the worksite of the work machine 100 or in a place relatively close to the worksite (for example, a building, a base station, or the like of a communication carrier). The management device 200 may be a stationary-type terminal device that is installed in a management office or the like in the worksite of the work machine 100, or a portable-type terminal device (mobile device). The stationary-type terminal device may include, for example, a desktop-type computer terminal. The portable-type terminal device may include, for example, a smartphone, a tablet terminal, a laptop-type computer terminal, and the like.

The management device 200 includes, for example, a communication device 220 (see FIG. 2 and FIG. 3), and communicates with the work machine 100 via the communication line NW as described above. Accordingly, the management device 200 can receive various types of information uploaded from the work machine 100 and transmit various types of signals to the work machine 100. Therefore, the user of the management device 200 can confirm various kinds of information on the work machine 100 through an output device 240 (see FIG. 2 and FIG. 3). For example, the management device 200 can also transmit an information signal to the work machine 100 to provide information necessary for work or transmit a control signal to the work machine 100 to control the work machine 100. The user of the management device 200 may include, for example, an owner of the work machine 100; a manager of the work machine 100; an engineer of a manufacturer of the work machine 100; an operator of the work machine 100; a manager; a supervisor; and a worker of the worksite where the work machine 100 is; and the like.

The management device 200 may also be configured to be able to support remote operation of the work machine 100. For example, the management device 200 may include an input device for an operator to perform remote operation (hereinafter referred to as a "remote operation device" for convenience) and a remote operation display device that displays image information (peripheral image) representing the periphery of the work machine 100, and the like. The signal input from the remote operation device is transmitted to the work machine 100 as a remote operation signal. Thus, the user (operator) of the management device 200 can remotely operate the work machine 100 using the remote operation device while ascertaining the situation in the area surrounding the work machine 100 on the remote operation display device.

Furthermore, the management device 200 may be configured to be able to support remote monitoring of the work machine 100 that works fully automatically. For example, the management device 200 may include a display device (hereinafter, "display device for monitoring") that displays image information (peripheral image) representing the periphery of the work machine 100 and the like. Accordingly, the user (monitoring person) of the management device 200 can monitor the situation in the area surrounding the work of the work machine 100 on the display device for monitoring. For example, the management device 200 may include an input device (hereinafter referred to as an "intervention operation device" for convenience) for performing an intervention operation with respect to the operation by the automatic driving function of the work machine 100. The intervention operation device may include, for example, an input device for making an emergency stop of the work machine 100. The intervention operation device may also include the above-described remote operation device. Accordingly, when an abnormality occurs in the work machine 100, when the operation of the work machine 100 is inappropriate or the like, the user (monitoring person) of the management device 200 can perform an emergency stop of the work machine 100 or perform remote operation for causing the work machine 100 to perform an appropriate operation.

Configuration of Work Machine Management
System

The configuration of the work machine management system SYS will now be described with reference to FIG. 4 to FIG. 7.

Figure 4:
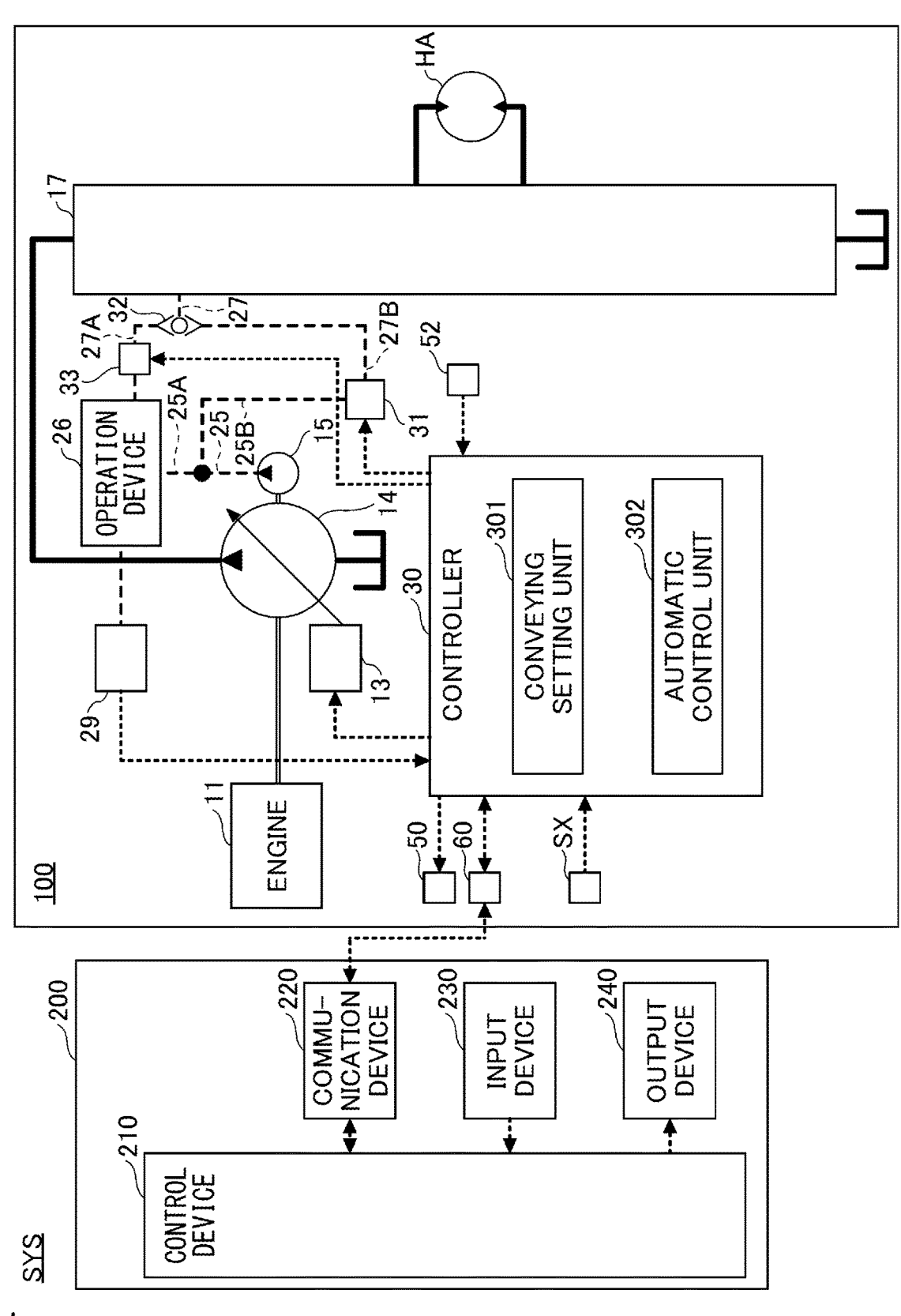
FIG. 4 is a diagram illustrating an example of a configuration of the work machine management system.
Figure 5:
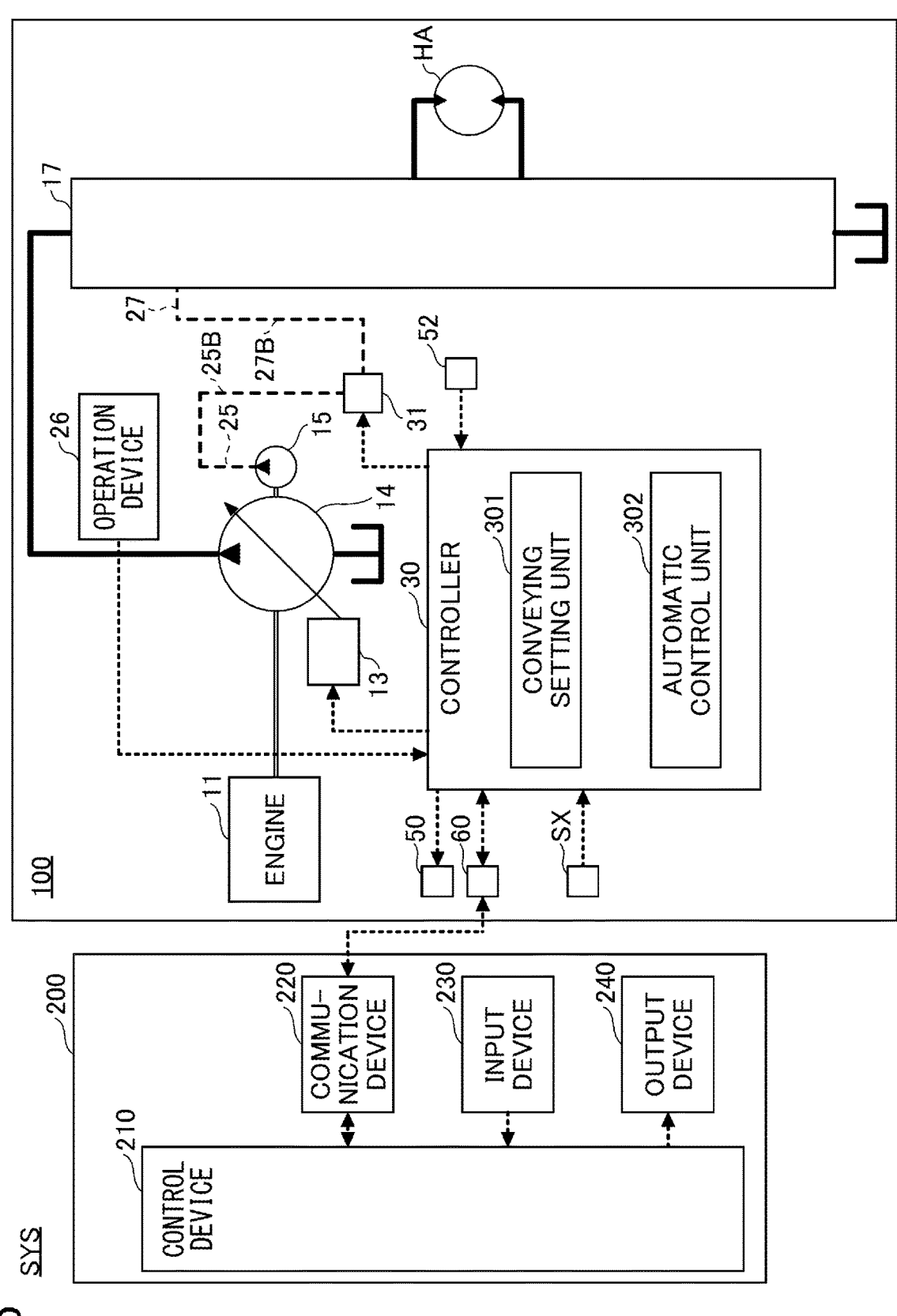
FIG. 5 is a diagram illustrating another example of the configuration of the work machine management system.
Figure 6:
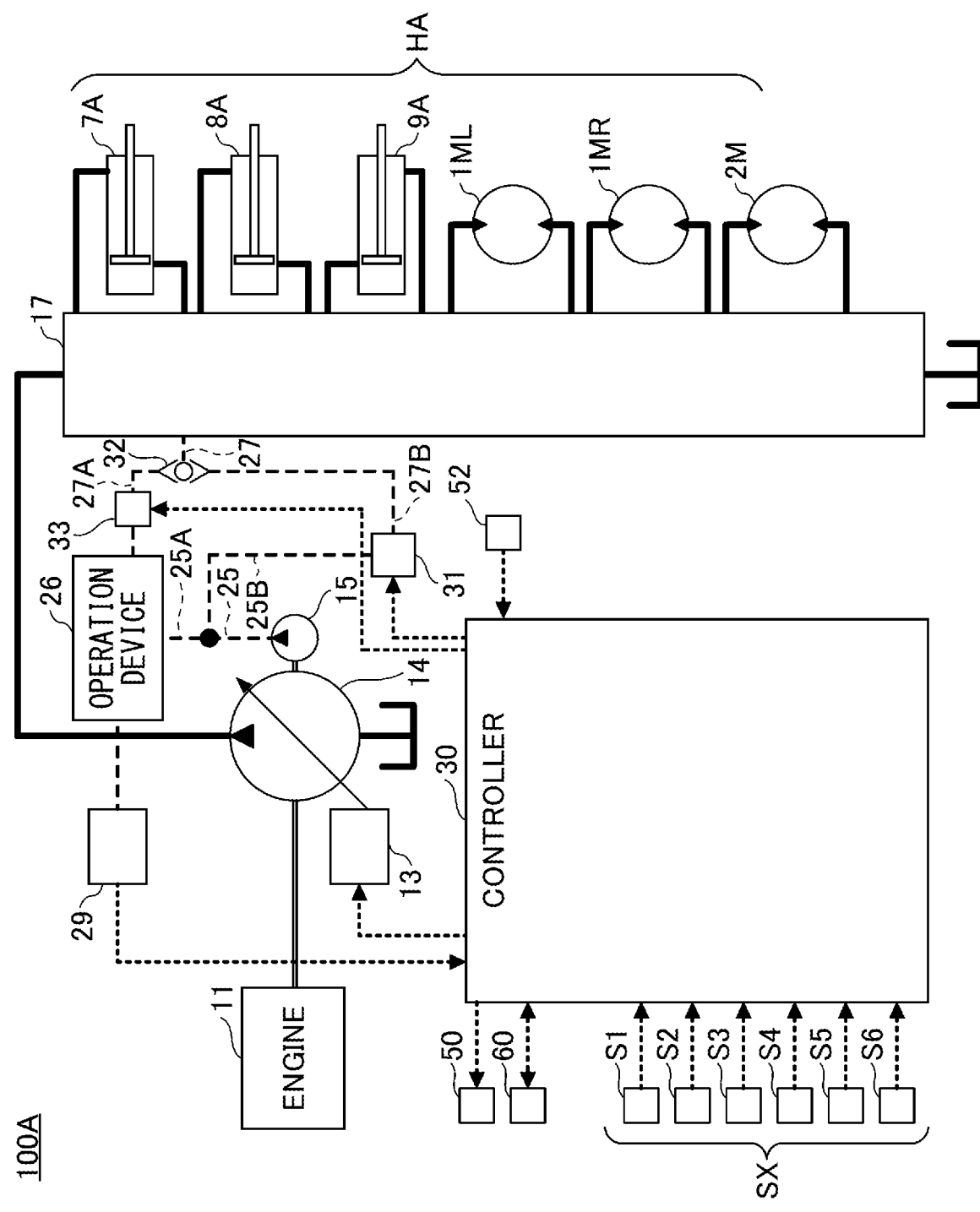
FIG. 6 is a diagram illustrating an example of a configuration of the shovel.
Figure 7:
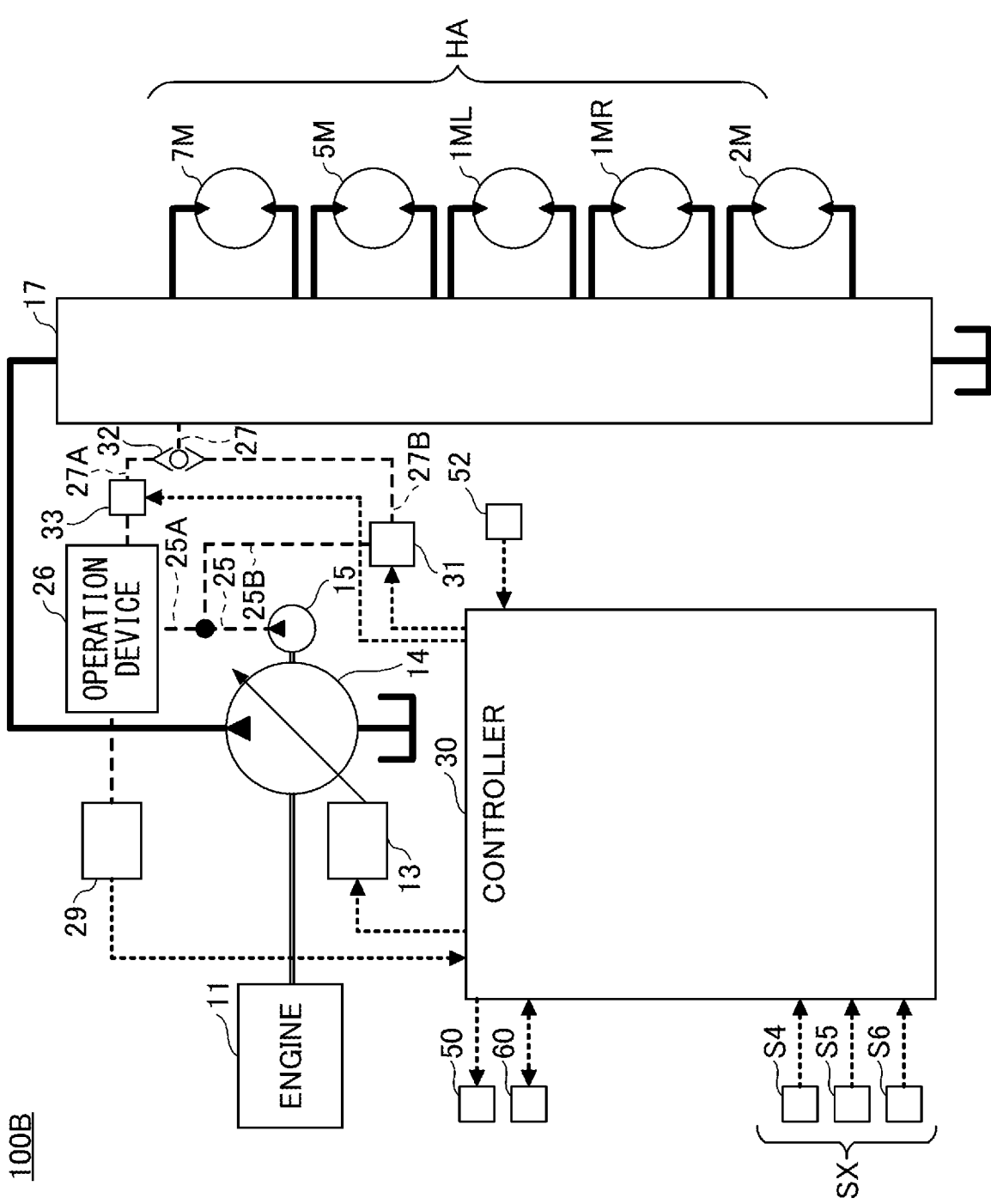
FIG. 7 is a diagram illustrating an example of a configuration of the crawler crane.

FIG. 4 and FIG. 5 are block diagrams illustrating an example and another example of the configuration of the work machine management system SYS according to the present embodiment, respectively. FIG. 6 is a diagram illustrating an example of the configuration of a shovel 100A. Specifically, FIG. 6 illustrates an example of the configuration of the shovel 100A corresponding to FIG. 4. FIG. 7 is a diagram illustrating an example of the configuration of a crawler crane 100B. Specifically, FIG. 7 is a diagram illustrating an example of the configuration of the crawler crane 100B corresponding to FIG. 4.

In FIG. 4 to FIG. 7, a path through which mechanical power is transmitted is indicated by a double line, a path through which high-pressure hydraulic oil for driving the hydraulic actuator flows is indicated by a solid line, a path through which pilot pressure is transmitted is indicated by a dashed line, and a path through which an electric signal is transmitted is indicated by a dotted line. FIG. 4 and FIG. 5 are different from each other only in the configuration related to the work machine 100 (operation device 26) among the work machine 100 and the management device 200. Therefore, the drawings illustrating specific examples of the configurations of the shovel 100A and the crawler crane 100B corresponding to FIG. 5 are omitted.

<Configuration of Work Machine>

The work machine 100 includes components such as a hydraulic drive system related to hydraulic drive of a driven element, an operation system related to operation of the driven element, a user interface system related to exchange of information with a user, a communication system related to communication with the outside, and a control system related to various controls.

<<Hydraulic Drive System>>

As illustrated in FIG. 4 and FIG. 5, the hydraulic drive system of the work machine 100 according to the present embodiment includes a hydraulic actuator HA that hydraulically drives the driven elements such as the lower traveling body 1 (the left and right crawlers 1C), the upper swing body 3, and the attachment AT, as described above. The hydraulic drive system of the work machine 100 according to the present embodiment includes an engine 11, a regulator 13, a main pump 14, and a control valve unit 17.

As illustrated in FIG. 6, when the work machine 100 is a shovel 100A, the hydraulic actuator HA includes the traveling hydraulic motors 1ML and 1MR, the swing hydraulic motor 2M, the boom cylinder 7A, the arm cylinder 8A, the bucket cylinder 9A, and the like.

As illustrated in FIG. 7, when the work machine 100 is a crawler crane 100B, the hydraulic actuator HA includes the traveling hydraulic motors 1ML and 1MR, the swing hydraulic motor 2M, the derricking hydraulic motor 5M, the main winding hydraulic motor 7M, and the like.

The engine 11 is a motor and is a main power source in the hydraulic drive system. The engine 11 is, for example, a diesel engine fueled with diesel fuel. The engine 11 is mounted on, for example, a rear portion of the upper swing body 3. The engine 11 constantly rotates at a predetermined target speed under direct or indirect control of a controller 30 described later to drive the main pump 14 and a pilot pump 15.

The regulator 13 controls (adjusts) the discharge amount of the main pump 14 under the control of the controller 30. For example, the regulator 13 adjusts the angle of a swash plate of the main pump 14 (Hereinafter, referred to as a "tilt angle") in response to a control instruction from the controller 30.

The main pump 14 supplies hydraulic oil to the control valve unit 17 through a high-pressure hydraulic line. The main pump 14 is, for example, mounted on the rear portion of the upper swing body 3 in the same manner as the engine 11. As described above, the main pump 14 is driven by the engine 11. The main pump 14 is, for example, a variable displacement hydraulic pump, and as described above, under the control of the controller 30, the regulator 13 adjusts the tilt angle of the swash plate, thereby adjusting the stroke length of the piston and controlling the discharge flow rate (discharge pressure).

The control valve unit 17 is a hydraulic control device that controls one or more of hydraulic actuators HA in response to contents of the operation or the remote operation on the operation device 26 by the operator or an operation instruction related to the automatic driving function output of the controller 30. The control valve unit 17 is mounted on, for example, the central portion of the upper swing body 3. As described above, the control valve unit 17 is connected to the main pump 14 via the high-pressure hydraulic line, and selectively supplies the hydraulic oil supplied from the main pump 14 to each hydraulic actuator in response to the operation of the operator or the operation instruction output of the controller 30. Specifically, the control valve unit 17 includes control valves (also referred to as "direction switching valves") that each controls the flow rate and the flow direction of the hydraulic oil supplied from the main pump 14 to the respective hydraulic actuators HA.

<<Operation System>>

As illustrated in FIG. 4 and FIG. 5, the operation system of the work machine 100 according to the present embodiment includes the pilot pump 15, the operation device 26, and a hydraulic pressure control valve 31. As illustrated in FIG. 4, the operation system of the work machine 100 according to the present embodiment includes a shuttle valve 32 and a hydraulic pressure control valve 33 when the operation device 26 is of a hydraulic pilot type.

The pilot pump 15 supplies a pilot pressure to various hydraulic devices via a pilot line 25. The pilot pump 15 is mounted on, for example, the rear portion of the upper swing body 3 in the same manner as the engine 11. The pilot pump 15 is, for example, a fixed displacement hydraulic pump, and is driven by the engine 11 as described above.

Note that the pilot pump 15 may be omitted. In such a case, a relatively low-pressure hydraulic oil obtained by reducing the pressure of a relatively high-pressure hydraulic oil discharged from the main pump 14 by a predetermined pressure reducing valve is supplied to various hydraulic devices as a pilot pressure.

The operation device 26 is provided in the vicinity of the operator's seat in the cabin 10, and is used by the operator to operate various driven elements. In other words, the operation device 26 is used by the operator to operate the hydraulic actuators HA that drive the respective driven elements. The operation device 26 includes a pedal device and a lever device for operating the respective driven elements (hydraulic actuators HA).

For example, as illustrated in FIG. 4, the operation device 26 is a hydraulic pilot type. Specifically, the operation device 26 uses the hydraulic oil supplied from the pilot pump 15 through the pilot line 25 and a pilot line 25A branched from the pilot line 25, to output the pilot pressure according to the operation contents to a pilot line 27A on the secondary side. The pilot line 27A is connected to one of inlet ports of the shuttle valve 32, and connected to the control valve unit 17 via a pilot line 27 connected to the outlet port of the shuttle valve 32. Thus, the pilot pressure according to the operation contents related to various driven elements (hydraulic actuators HA) on the operation device 26 can be input to the control valve unit 17 via the shuttle valve 32. Therefore, the control valve unit 17 can drive the respective hydraulic actuators HA according to the operation contents on the operation device 26 by the operator or the like.

For example, as illustrated in FIG. 5, the operation device 26 is an electric type. Specifically, the operation device 26 outputs an electric signal (hereinafter, referred to as an "operation signal") according to the operation contents, and the operation signal is received by the controller 30. The controller 30 then outputs a control instruction according to the contents of the operation signal, that is, a control signal according to the operation contents on the operation device 26 to the hydraulic pressure control valve 31. Accordingly, the pilot pressure according to the operation contents on the operation device 26 is input from the hydraulic pressure control valve 31 to the control valve unit 17, and the control valve unit 17 can drive the respective actuators HA according to the operation contents of the operation device 26.

The control valves (direction switching valves) provided in the control valve unit 17 driving the hydraulic actuators may be of an electromagnetic solenoid type. In such a case, an operation signal output of the operation device 26 may be directly input to the control valve unit 17, that is, the control valves of the electromagnetic solenoid type.

The hydraulic pressure control valve 31 is provided for each driven element (hydraulic actuator HA) to be operated by the operation device 26. For example, the hydraulic pressure control valve 31 may be provided in a pilot line 25B between the pilot pump 15 and the control valve unit 17, and may be configured to be able to change the size of the flow path area (that is, a cross-sectional area in which the hydraulic oil can flow). Accordingly, the hydraulic pressure control valve 31 can output a predetermined pilot pressure to a pilot line 27B on the secondary side by using the hydraulic oil of the pilot pump 15 supplied through the pilot line 25B. Therefore, as illustrated in FIG. 4, the hydraulic pressure control valve 31 can indirectly apply a predetermined pilot pressure according to the control signal from the controller 30 to the control valve unit 17 through the shuttle valve 32 between the pilot line 27B and the pilot line 27. In contrast, as illustrated in FIG. 5, the hydraulic pressure control valve 31 can directly apply a predetermined pilot pressure according to the control signal from the controller 30 to the control valve unit 17 through the pilot line 27B and the pilot line 27. Therefore, the controller 30 can supply a pilot pressure according to the operation contents on the operation device 26 of the electric type from the hydraulic pressure control valve 31 to the control valve unit 17, and the operation of the work machine 100 based on the operation of the operator can be achieved.

Further, the controller 30 may control, for example, the hydraulic pressure control valve 31 to achieve an automatic driving function. Specifically, the controller 30 outputs, to the hydraulic pressure control valve 31, a control signal according to an operation instruction related to the automatic driving function regardless of whether or not the operation device 26 is operated. Thereby, the controller 30 can supply a pilot pressure according to the operation instruction related to the automatic driving function from the hydraulic pressure control valve 31 to the control valve unit 17, and the operation of the work machine 100 based on the automatic driving function can be achieved.

The controller 30 may also control, for example, the hydraulic pressure control valve 31 to achieve remote operation of the work machine 100. Specifically, the controller 30 outputs, to the hydraulic pressure control valve 31, a control signal according to the contents of remote operation specified by the remote operation signal received from the management device 200 through the communication device 60. Thereby, the controller 30 can supply a pilot pressure according to the contents of the remote operation from the hydraulic pressure control valve 31 to the control valve unit 17, and the operation of the work machine 100 based on the remote operation by the operator can be achieved.

As illustrated in FIG. 4, the shuttle valve 32 has two inlet ports and one outlet port, and outputs, from the outlet port, a hydraulic oil having a higher pilot pressure from among the pilot pressures applied to the two inlet ports. The shuttle valve 32 is provided for each driven element (hydraulic actuator HA) to be operated by the operation device 26. One of the two inlet ports of the shuttle valve 32 is connected to the pilot line 27A on the secondary side of the operation device 26 (Specifically, the above-described lever device or pedal device included in the operation device 26), and the other of the two is connected to the pilot line 27B on the secondary side of the hydraulic pressure control valve 31. The outlet port of the shuttle valve 32 is connected to the pilot port of a corresponding control valve of the control valve unit 17 through the pilot line 27. The corresponding control valve is a control valve for driving a hydraulic actuator to be operated by the above-described lever device or the pedal device connected to one of the inlet ports of the shuttle valve 32. Therefore, each of the shuttle valve 32 can apply, to the pilot port of the corresponding control valve, the higher one of the pilot pressure of the pilot line 27A on the secondary side of the operation device 26 and the pilot pressure of the pilot line 27B on the secondary side of the hydraulic pressure control valve 31. That is, the controller 30 outputs, from the hydraulic pressure control valve 31, a pilot pressure higher than the pilot pressure on the secondary side of the operation device 26 to control the corresponding control valve regardless of the operation of the operation device 26 by the operator. Therefore, the controller 30 can control the operation of the driven elements (the lower traveling body 1, the upper swing body 3, and the attachment AT) and the automatic driving function can be achieved, regardless of the operation state of the operation device 26 by the operator.

As illustrated in FIG. 4, the hydraulic pressure control valve 33 is provided in the pilot line 27A connecting the operation device 26 and the shuttle valve 32. The hydraulic pressure control valve 33 is configured to be able to change the size of the flow path area. The hydraulic pressure control valve 33 operates in response to a control signal input from the controller 30. Thus, when the operation device 26 is operated by the operator, the controller 30 can forcibly reduce the pilot pressure output of the operation device 26. Therefore, even when the operation device 26 is operated, the controller 30 can forcibly suppress or stop the operation of the hydraulic actuator corresponding to the operation of the operation device 26. Furthermore, for example, even when the operation device 26 is operated, the controller 30 can reduce the pilot pressure output of the operation device 26 to be lower than the pilot pressure output of the hydraulic pressure control valve 31. Therefore, by controlling the hydraulic pressure control valve 31 and the hydraulic pressure control valve 33, the controller 30 can reliably apply a desired pilot pressure to the pilot port of the control valve in the control valve unit 17 regardless of the operation contents on the operation device 26, for example. The controller 30, therefore, can more appropriately achieve the automatic operation function and the remote operation function of the work machine 100 by controlling the hydraulic pressure control valve 33 in addition to the hydraulic pressure control valve 31, for example.

<<User Interface System>>

As illustrated in FIG. 4 and FIG. 5, the user interface system of the work machine 100 according to the present embodiment includes the operation device 26, the output device 50, and an input device 52.

The output device 50 outputs various types of information to a user (operator) of the work machine 100 inside the cabin 10.

For example, the output device 50 includes an indoor lighting device, a display device, or the like that is provided at a position easily visible from the seated operator in the cabin 10 and outputs various kinds of visual information. The lighting device is, for example, a warning lamp or the like. The display device is, for example, a liquid crystal display, an organic electroluminescence (EL) display, or the like.

The output device 50 also includes, for example, a sound output device that outputs various kinds of auditory information. The sound output device includes, for example, a buzzer and a speaker.

The output device 50 also includes, for example, a device that outputs various kinds of information in a tactile manner, such as vibration of the operator's seat.

The input device 52 is provided in a range close to an operator seated in the cabin 10, receives various inputs from the operator, and outputs signals in response to the received input is to the controller 30.

For example, the input device 52 is an operation input device that receives an operation input. The operation input device may include a touch panel mounted on the display device, a touch pad provided around the display device, a button switch, a lever, a toggle, a knob switch provided on the operation device 26 (lever device), and the like.

The input device 52 may be, for example, a voice input device that receives an operator's voice input. The voice input device includes, for example, a microphone.

Furthermore, the input device 52 may be, for example, a gesture input device that receives an operator's gesture input. The gesture input device includes, for example, an imaging device (indoor camera) installed in the cabin 10.

<<Communication System>>

As illustrated in FIG. 4 and FIG. 5, the communication system of the work machine 100 according to the present embodiment includes the communication device 60.

The communication device 60 is connected to the communication line NW and communicates with a device (for example, the management device 200) provided separately from the work machine 100. The device provided separately from the work machine 100 may include a portable terminal device brought into the cabin 10 by a user of the work machine 100 in addition to a device outside the work machine 100. The communication device 60 may include, for example, a mobile communication module conforming to a communication standard such as 4th Generation (4G) or 5th Generation (5G). The communication device 60 may also include, for example, a satellite communication module. Furthermore, the communication device 60 may include, for example, a WiFi communication module, a Bluetooth (registered trademark) communication module, and the like.

<<Control System>>

As illustrated in FIG. 4 and FIG. 5, the control system of the work machine 100 according to the present embodiment includes the controller 30. The control system of the work machine 100 according to the present embodiment also includes an acquisition device SX. As illustrated in FIG. 4, the control system of the work machine 100 according to the present embodiment further includes an operation pressure sensor 29 when the operation device 26 is a hydraulic pilot type.

The controller 30 (an example of the control device) performs various types of control with respect to the work machine 100. The functions of the controller 30 may be implemented by any given hardware, any combination of hardware and software, or the like. For example, the controller 30 is mainly constituted by a computer including one or more processors such as a central processing unit (CPU), a memory device such as a random access memory (PAM), a nonvolatile auxiliary storage device such as a read only memory (ROM), I/O interface devices, and the like. The controller 30 performs various functions by, for example, loading a program installed in the auxiliary storage device onto the memory device and executing the program by the CPU.

The controller 30 performs control related to the operation of the hydraulic actuator HA (driven element) of the work machine 100, for example, by controlling the hydraulic pressure control valve 31.

Specifically, the controller 30 may perform control related to the operation of the hydraulic actuator HA (driven element) of the work machine 100 based on the operation of the operation device 26, by controlling the hydraulic pressure control valve 31.

The controller 30 may also perform control related to remote operation of the hydraulic actuator HA (driven element) of the work machine 100 by controlling the hydraulic pressure control valve 31. That is, the operation of the hydraulic actuator HA (driven element) of the work machine 100 may include remote operation of the hydraulic actuator HA from outside the work machine 100.

The controller 30 may also perform control related to the automatic driving function of the work machine 100 by controlling the hydraulic pressure control valve 31. That is, the operation of the hydraulic actuator HA of the work machine 100 may include an operation instruction on the hydraulic actuator HA of the work machine 100, the operation instruction being output based on the automatic driving function.

For example, the controller 30 performs control for automatically conveying the suspended load SL suspended from the hook HK to a conveying destination (hereinafter, referred to as "automatic conveying control"). The controller 30 includes a conveying setting unit 301 and an automatic control unit 302 as functional units related to the automatic conveying control. The functions of the conveying setting unit 301 and the automatic control unit 302 are implemented by, for example, loading a program installed in the auxiliary storage device onto the memory device and executing the program by the CPU.

A part of the functions of the controller 30 may be implemented by another controller (control device). That is, the functions of the controller 30 may be implemented by multiple controllers in a distributed manner.

As illustrated in FIG. 4, the operation pressure sensor 29 detects the pilot pressure on the secondary side (pilot line 27A) of the hydraulic pilot type operation device 26, that is, the pilot pressure according to the operation state of each of the driven elements (hydraulic actuators) in the operation device 26. A detection signal of the pilot pressure according to the operation state of each driven element (hydraulic actuator HA) in the operation device 26 by the operation pressure sensor 29 is loaded into the controller 30.

The acquisition device SX acquires information on the state of the shovel 100A, a situation in an area surrounding the shovel 100A, and the like. The output of the acquisition device SX is loaded into the controller 30.

As illustrated in FIG. 6, when the work machine 100 is the shovel 100A, the acquisition device SX includes a boom angle sensor S1, an arm angle sensor S2, a bucket angle sensor S3, a machine body inclination sensor S4, a swing state sensor S5, and an imaging device S6.

As illustrated in FIG. 7, when work machine 100 is the crawler crane 100B, the acquisition device SX includes a machine body inclination sensor S4, a swing state sensor S5, and an imaging device S6.

The boom angle sensor S1 acquires detection information on an attitude angle of the boom 4A (hereinafter referred to as a "boom angle") with respect to a predetermined condition (for example, a horizontal plane, a state of one of both ends of a movable angle range of the boom 4A, or the like). The boom angle sensor S1 may include, for example, a rotary encoder, an accelerometer, an angular velocity sensor, a six-axis sensor, an inertial measurement unit (IMU), and the like. The boom angle sensor S1 may also include a cylinder sensor capable of detecting a an extended/retracted position of the boom cylinder 7A.

The arm angle sensor S2 acquires detection information on an attitude angle of the arm 5A (hereinafter referred to as an "arm angle") with respect to a predetermined condition (for example, a straight line connecting connection points at both ends of the boom 4A, a state of one of both ends of a movable angle range of the arm 5A, or the like). The arm angle sensor S2 may include, for example, a rotary encoder, an accelerometer, an angular velocity sensor, a six-axis sensor, an IMU, and the like. The arm angle sensor S2 may also include a cylinder sensor capable of detecting an extended/retracted position of the arm cylinder 8A.

The bucket angle sensor S3 acquires detection information on an attitude angle of the bucket 6A (hereinafter, referred to as a "bucket angle") with respect to a predetermined condition (for example, a straight line connecting connection points at both ends of the arm 5A, a state of one of both ends of a movable angle range of the bucket 6A, or the like). The bucket angle sensor S3 may include, for example, a rotary encoder, an accelerometer, an angular velocity sensor, a six-axis sensor, an IMU, and the like. The bucket angle sensor S3 may also include a cylinder sensor capable of detecting an extended/retracted position of the bucket cylinder 9A.

The machine body inclination sensor S4 acquires detection information on an inclination state of the machine body of the work machine 100 including the lower traveling body 1 and the upper swing body 3. The machine body inclination sensor S4 is mounted on the upper swing body 3, for example, and acquires detection information on inclination angles in the front-rear direction and the left-right direction of the upper swing body 3 (hereinafter, "front-rear inclination angle" and "left-right inclination angle"). The machine body inclination sensor S4 may include, for example, an accelerometer (inclination sensor), an angular velocity sensor, a six-axis sensor, an IMU, and the like.

The swing state sensor S5 acquires detection information on a swing state of the upper swing body 3. The swing state sensor S5 acquires, for example, detection information on a swing angle of the upper swing body 3 with respect to a predetermined condition (for example, a state in which the forward traveling direction of the lower traveling body 1 coincides with the front side of the upper swing body 3). The swing state sensor S5 includes, for example, a potentiometer, a rotary encoder, a resolver, and the like.

When the machine body inclination sensor S4 includes an additional component (for example, a six-axis sensor, an IMU, or the like) capable of acquiring detection information on the attitude state of the upper swing body 3 including not only the inclination angle but also the swing angle of the upper swing body 3, the swing state sensor S5 may be omitted.

The work machine 100 may be further equipped with, for example, a positioning device capable of measuring an absolute position of the work machine 100. The positioning device is, for example, a global navigation satellite system (GNSS) sensor. With this positioning device, it is possible to improve the estimation accuracy of the attitude state of the work machine 100.

The sensors S1 to S5 may be omitted. For example, the periphery information of the shovel 100A acquired by the imaging device S6, a distance sensor to be described later, or the like may include information related to a position, a shape, and the like of an object or an attachment in the periphery viewed from the machine body (the upper swing body 3). In this case, for example, the controller 30 can estimate the attitude state of the shovel 100A from the information depending on the required accuracy.

The work machine 100 may be further equipped with, for example, a positioning device capable of measuring an absolute position of the work machine 100. The positioning device is, for example, a global navigation satellite system (GNSS) sensor. With this positioning device, it is possible to improve the estimation accuracy of the attitude state of the shovel 100A. Hereinafter, the same may be applied to the case of the crawler crane 100B.

The imaging device S6 (an example of a periphery recognition device) captures an image of the periphery of the work machine 100, and outputs the captured image (an example of information related to a situation of the surrounding area). The captured image output of the imaging device S6 is loaded into the controller 30.

The imaging device S6 includes, for example, a monocular camera, a stereo camera, a depth camera, and the like. In addition, the imaging device S6 may acquire three-dimensional data (for example, point group data or surface data) representing a location and an outer shape of an object around the shovel 100A within a predetermined imaging range (angle of view) based on the captured image. Hereinafter, the same may be applied to the imaging device S6 of the crawler crane 100B.

Instead of or in addition to the imaging device S6, a distance sensor (an example of a periphery recognition device) such as a light detecting and ranging (LIDAR), a millimeter wave radar, an ultrasonic sensor, an infrared sensor, or a distance image sensor may be mounted on the shovel 100A, for example. The distance sensor may acquire three-dimensional data (for example, point group data) (an example of information related to the situation of the surrounding area) representing a location and an outer shape of an object around the shovel 100A within a predetermined detecting range. Hereinafter, the same may be applied to the imaging device S6 of the crawler crane 100B.

As illustrated in FIG. 2, the imaging device S6 of the shovel 100A is attached to, for example, the front end of the upper surface of the cabin 10, and captures and outputs an image of the front area of the upper swing body 3 including the work range of the end attachment (bucket 6A) and the hook HK. As illustrated in FIG. 3, the imaging device S6 of the crawler crane 100B is attached to the boom 4B, for example, and captures and outputs an image of the front area of the upper swing body 3 including the work range of the hook HK. Thereby, the controller 30 can recognize the situation in an area in front of the work machine 100 based on the output of the imaging device S6. The controller 30 can also recognize the location of the work machine 100, the swing state of the upper swing body 3, and the like based on the position of an object peripheral to the work machine 100, a change in appearance, and the like recognized from the output (captured image) of the imaging device S6. Furthermore, at least a part of the attachment AT is included in the imaging range of the imaging device S6. Accordingly, the controller 30 can recognize the attitude state of the attachment AT, the location of the hook HK at the distal end of the attachment AT, and the like based on the output of the imaging device S6. Therefore, when the work machine 100 is remotely operated, the controller 30 can transmit the peripheral image and information on the recognition result based on the output of the imaging device S6 to the management device 200 or the like, and provide an external operator with information on the work machine 100 (own machine) and the situation in the area surrounding the machine. When the work machine 100 operates in the fully automatic driving function, a control device (for example, the controller 30) related to the fully automatic driving function can output operation instructions related to the hydraulic actuators while ascertaining the situation in the area surrounding the shovel 100A, the attitude state of the machine itself, and the like. In addition, when the work machine 100 operates in the fully automatic driving function, the controller 30 can transmit the peripheral image and information on the recognition result based on the output of the imaging device S6 to the management device 200 or the like, and provide a user (monitoring person) who externally monitors the work with information the shovel 100A (own machine) and the situation in the area surrounding the shovel.

Furthermore, the imaging device S6 may be configured to be able to acquire and output an image related to at least one of the left side, the right side, and the rear side of the upper swing body 3. Specifically, the imaging device S6 may include, in addition to the camera capable of imaging the front side of the upper swing body 3, at least one of a camera capable of imaging the left side of the upper swing body 3, a camera capable of imaging the right side of the upper swing body 3, and a camera capable of imaging the rear side of the upper swing body 3. Thus, the controller 30 can recognize not only the situation in the area in front of the work machine 100 (upper swing body 3) but also the situation in the area on the left, right, or rear side of the work machine 100 (upper swing body 3).

The conveying setting unit 301 performs various settings related to automatic conveying control.

The conveying setting unit 301 sets, for example, a conveying destination location to which the suspended load SL is conveyed by automatic conveying control (see FIG. 8 to FIG. 11 described later).

For example, the conveying setting unit 301 may set a conveying destination location of the suspended load SL in accordance with an instruction on the conveying destination location input by the operator through the input device 52 (an example of the first acquisition device).

The conveying setting unit 301 may also set, for example, a conveying destination location of the suspended load SL in accordance with an instruction on the conveying destination location input by the operator or the monitoring person through an input device 230 described below. In this case, the management device 200 (control device 210) transmits an information signal including instruction information of the conveying destination location input from the input device 230 to the work machine 100 through the communication device 220 described later. Accordingly, the conveying setting unit 301 can receive the information signal through the communication device 60 (an example of the first acquisition device) and recognize the instruction on the conveying destination location input by the operator or the monitoring person of the management device 200. Hereinafter, the same may be applied to the setting of the conveying path of the suspended load SL to the conveying destination, the setting of the suspended load SL to be conveyed, and the like.

The conveying setting unit 301 may also set, for example, the conveying destination in accordance with a control signal that specifies the conveying destination location. The control signal is received from a predetermined external device (for example, the management device 200) through the communication device 60. In particular, this is effective when the conveying destination location of the suspended load SL is defined in advance on the external device side.

The conveying setting unit 301 may also set, for example, the conveying destination location of the suspended load SL according to an instruction from a worker around the work machine 100. Specifically, the conveying setting unit 301 may recognize a location indicated by the worker using a laser pointer on the image captured by the imaging device S6 (an example of the first acquisition device), and set the recognized location as the conveying destination of the suspended load SL. The conveying setting unit 301 may also recognize a worker who performs a predetermined gesture or pose on the image output of the imaging device S6, and set the location of the recognized worker as the conveying destination. Furthermore, the conveying setting unit 301 may acquire a captured image of an imaging device (camera) installed in the worksite through the communication device 60, and set a location indicated by the laser pointer, a location of the worker, or the like, that is recognized in the same manner as described above, as the conveying destination.

Furthermore, the conveying setting unit 301 sets a conveying path of the suspended load SL to a conveying destination when the suspended load SL is conveyed by the automatic conveying control (see FIG. 10 described later).

For example, the conveying setting unit 301 may set the conveying path of the suspended load SL to the conveying destination in accordance with an instruction on the conveying path input by the operator through the input device 52.

In addition, for example, the conveying setting unit 301 may set the conveying path of the suspended load SL to the conveying destination according to an instruction on the conveying destination input by the operator or the monitoring person through the input device 230.

The conveying setting unit 301 may also set, for example, the conveying path of the suspended load SL to the conveying destination in accordance with a control signal specifying the conveying destination location received from a predetermined external device through the communication device 60.

The conveying setting unit 301 may also set, for example, the conveying path of the suspended load SL according to an instruction from a worker around the work machine 100. Specifically, the conveying setting unit 301 may recognize a change in location indicated by the worker with a laser pointer based on the captured image of the imaging device S6, and set a track corresponding to the recognized change in location as the conveying path of the suspended load SL. The conveying setting unit 301 may also recognize a change in the location of the worker who performs a predetermined gesture or pose based on the captured image of the imaging device S6, and set a track corresponding to the recognized change in the location of the worker as the conveying path.

Furthermore, when control for automatically conveying the hook HK to a location where the suspended load SL is positioned is included in the automatic conveying control, the conveying setting unit 301 sets the suspended load SL as a subject to be conveyed from among the objects captured in the image information output of the imaging device S6 (see FIG. 11 described later).

For example, the conveying setting unit 301 extracts at least one candidate object for the suspended load SL from the image information output of the imaging device S6 by using a known image recognition technique, and causes the output device 50 (display device) to display the one or more candidate objects together with the image information output of the imaging device S6. The conveying setting unit 301 may then set, as the subjected suspended load SL to be conveyed, the candidate object selected by the user through the input device 52 from among the one or more candidate objects for the suspended load SL in the image information output of the imaging device S6 displayed on the output device 50.

The conveying setting unit 301 also extracts, for example, at least one candidate object for the suspended load SL from the image information output of the imaging device S6 using a known image recognition technique, and causes the output device 240 (display device) described below to display the one or more candidate objects together with the image information output of the imaging device S6. Specifically, the conveying setting unit 301 transmits, to the management device 200 through the communication device 60, an information signal including the image information output of the imaging device S6 and the information on the candidate objects for the suspended load SL extracted from the image information. Accordingly, the management device 200 (control device 210) can cause the output device 240 to display the image information output of the imaging device S6 and the information for specifying the one or more candidate objects for the suspended load SL. The conveying setting unit 301 may then set, as the subjected suspended load SL to be conveyed, the candidate object selected by the user through the input device 230 from among the one or more candidate objects for the suspended load SL in the image information output of the imaging device S6 displayed on the output device 240. Specifically, the management device 200 (control device 210) transmits, to the work machine 100 through the communication device 220, an information signal including information on the candidate object selected by the user through the input device 230 from among the one or more candidate objects for the suspended load SL in the image information output form the imaging device S6 displayed on the output device 240. Thus, the conveying setting unit 301 can set the suspended load SL in accordance with the information signal received from the management device 200 through the communication device 60.

The automatic control unit 302 controls the hydraulic pressure control valve 31 and causes at least one of the lower traveling body 1, the upper swing body 3, and the attachment AT to operate automatically, thereby automatically conveying the suspended load SL suspended from the hook HK to the conveying destination location of the suspended load SL set by the conveying setting unit 301.

Specifically, the automatic control unit 302 may recognize the situation in the area surrounding the work machine 100 based on the output of the imaging device S6 or the distance sensor (each of which is an example of the second acquisition device), and generate a conveyance track (hereinafter referred to as a "target track") serving as a target route to the conveying destination for the hook HK or the suspended load SL. The automatic control unit 302 may also acquire an output of an imaging device, a distance sensor, or the like installed in the worksite of the work machine 100 through the communication device 60 (an example of the second acquisition device), and generate a target track based on the acquired data. At this time, for example, the automatic control unit 302 generates a more efficient target track, that is, a straight target track, in a top view of the work machine 100, that connects the location of the suspended load SL and the conveying destination location such that the distance therebetween is the shortest distance possible. The automatic control unit 302 may also recognize the situation in the area surrounding the work machine 100 based on the output of the imaging device S6 or the distance sensor, and generate a target track in such a manner as to avoid (detour around) the worker or another obstacle when the worker or the other obstacle is present. Furthermore, when a conveying path is set by the conveying setting unit 301, the automatic control unit 302 may set a target track along the conveying path. The automatic control unit 302 may then recognize the location of the hook HK or the suspended load SL based on the output of the acquisition device SX and automatically cause at least one of the lower traveling body 1, the upper swing body 3, and the attachment AT to operate so that the hook HK or the suspended load SL moves along the target track. The automatic control unit 302 may also automatically cause, for example, at least one of the lower traveling body 1, the upper swing body 3, and the attachment AT to operate while recognizing the situation in the area surrounding the work machine 100 in real time based on the output of the imaging device S6 or the distance sensor and appropriately correcting the target track.

When the suspended load SL is automatically conveyed to the conveying destination, the automatic control unit 302 may perform control to suppress swing of the suspended load SL.

Specifically, for example, the automatic control unit 302 sequentially recognizes the position of the hook HK and the position of the suspended load SL based on the output of the imaging device S6 or the distance sensor. The automatic control unit 302 may then control the operations of the lower traveling body 1, the upper swing body 3, and the attachment AT so that the deviation between the positions of the hook HK and the suspended load SL when viewed from above is reduced, that is, so that the hook HK is positioned right above the suspended load SL.

The automatic control unit 302 may also automatically cause the upper swing body 3 and the attachment AT with priority over the lower traveling body 1 to operate to automatically convey the suspended load SL suspended from the hook HK to the conveying destination location of the suspended load SL set by the conveying setting unit 301. This is because, for example, moving the suspended load SL by moving the upper swing body 3 or the attachment AT provides a higher degree of freedom in positioning and facilitates suppression of the swing of the suspended load SL than moving the suspended load SL by traveling the lower traveling body 1. For example, the automatic control unit 302 determines whether or not the suspended load SL can be conveyed to the conveying destination location only by the operations of the upper swing body 3 and the attachment AT. When it is determined that the suspended load SL can be conveyed to the conveying destination location only by the operations of the upper swing body 3 and the attachment AT, the automatic control unit 302 may automatically convey the suspended load SL to the conveying destination location by automatically causing the upper swing body 3 and the attachment AT to operate. On the other hand, when it is determined that the suspended load SL cannot be conveyed to the conveying destination location only by the operations of the upper swing body 3 and the attachment AT, the automatic control unit 302 may automatically convey the suspended load SL to the conveying destination location by automatically causing the lower traveling body 1 and at least one of the upper swing body 3 and the attachment AT to operate. At this time, the automatic control unit 302 may determine whether or not the suspended load SL can be conveyed to the conveying destination location only by the operations of the upper swing body 3 and the attachment AT in consideration of the stability of the attitude of the work machine 100. That is, the automatic control unit 302 may determine whether or not the suspended load SL can be conveyed to the conveying destination location only by the operations of the upper swing body 3 and the attachment AT within a range in which the attitude of the work machine 100 is stable. For example, the automatic control unit 302 may determine the stability of the attitude of the work machine 100 based on the attitude state of the attachment AT, the operation state of the attachment AT, the swing state of the upper swing body 3 with respect to the lower traveling body 1, the inclination state of the machine body, and the like. This is because, for example, when the distal end (hook HK) of the attachment AT is moved to a position relatively away from the upper swing body 3, the moment in the direction in which the machine body (lower traveling body 1 and upper swing body 3) is caused to fall becomes relatively large, and there is a possibility that the work machine 100 tips over forward. This is also because, for example, when the orientation of the lower traveling body 1 (crawler 1C) and the orientation of the upper swing body 3 (that is, the direction in which the attachment AT extends) are shifted from each other, the work machine 100 is more likely to tip over depending on the attitude and operation of the attachment AT than when the orientations are aligned with each other. This is also because, for example, in case where the work machine 100 performs work on a slope, when the attachment AT is oriented in the downward direction, the moment that causes the machine body to tip over in the downward direction becomes relatively large, and there is a possibility that the work machine 100 tips over in the downward direction.

The work machine 100 (controller 30) may have multiple operation modes (hereinafter referred to as "conveying modes") related to which operating elements among the lower traveling body 1, the upper swing body 3, and the attachment AT are automatically caused to operate when automatically conveying the suspended load SL. In this case, for example, the controller 30 may select one conveying mode from multiple conveying modes in accordance with an input by the user through the input device 52 or the input device 230. That is, a user such as an operator in the cabin 10, an operator who remotely controls the management device 200, or a supervisor of remote monitoring can select one conveying mode from the conveying modes. For example, the work machine 100 has a first conveying mode in which all of the lower traveling body 1, the upper swing body 3, and the attachment AT can be used. The work machine 100 may have a second conveying mode in which only the upper swing body 3 and the attachment AT are automatically caused to operate, among the lower traveling body 1, the upper swing body 3, and the attachment AT. Accordingly, for example, when the user determines that the area having the undulating or uneven ground surface at the worksite of the work machine 100 is relatively large and is not suitable for the convey of the suspended load SL by the traveling of the lower traveling body 1, the user can select the second conveying mode through the input device 52 or the input device 230. However, in the second conveying mode, as described above, there may be a case where the suspended load SL cannot be conveyed to the conveying destination location. Therefore, when the suspended load SL cannot be conveyed to the conveying destination location, the controller 30 may notify the user of the fact through the output device 50 or the output device 240 and urge the user to change the conveying mode to the first conveying mode or to change the conveying destination location. The work machine 100 may also have a third conveying mode in which the operations of the upper swing body 3 and the attachment AT are prioritized among the lower traveling body 1, the upper swing body 3, and the attachment AT. Furthermore, the work machine 100 may have a fourth conveying mode in which the operation of the lower traveling body 1 is prioritized among the lower traveling body 1, the upper swing body 3, and the attachment AT. This is because, for example, depending on the conveying destination location of the suspended load SL, there is a possibility that the user may determine that it is more reasonable to cause the work machine 100 to travel by the lower traveling body 1.

The automatic control unit 302 may also automatically move the hook HK to a position above the suspended load SL by automatically causing at least one of the lower traveling body 1, the upper swing body 3, and the attachment AT to operate before suspending the suspended load SL when automatically conveying the suspended load SL.

Specifically, as in the case of the conveying of the suspended load SL to the conveying destination, the automatic control unit 302 may recognize the situation in the area surrounding the work machine 100 and generate A target track of the hook HK or the suspended load SL to the location of the suspended load SL set by the conveying setting unit 301. The automatic control unit 302 may then recognize the location of the hook HK or the suspended load SL based on the output of the acquisition device SX, and automatically cause at least one of the lower traveling body 1, the upper swing body 3, and the attachment AT to operate so that the hook HK or the suspended load SL moves along the target track. The automatic control unit 302 may also, for example, automatically cause at least one of the lower traveling body 1, the upper swing body 3, and the attachment AT to operate while recognizing the situation in the area surrounding the work machine 100 in real time based on the output of the imaging device S6 or the distance sensor and appropriately correcting the target track.

Furthermore, as in the case of automatic conveyance of the suspended load SL, when the hook HK is automatically moved to the position above the suspended load SL, the upper swing body 3 and the attachment AT may be automatically caused to operate with priority over the lower traveling body 1.

Furthermore, as described above, when one conveying mode is selected from the conveying modes, the selected one conveying mode may be effective also when the hook HK is automatically moved to the position above the suspended load SL. In other words, when one conveying mode is selected from the conveying modes, the selected conveying mode may be effective throughout the movement of the hook HK to the position above the suspended load SL and the automatic convey of the suspended load SL after slinging work.

<Configuration of Management Device>

As illustrated in FIG. 4 and FIG. 5, the management device 200 includes the control device 210, the communication device 220, the input device 230, and the output device 240.

The control device 210 performs various types of control related to the management device 200. The functions of the control device 210 are implemented by any given hardware, any combination of hardware and software, or the like. For example, the control device 210 is mainly constituted by a computer including one or more processors such as a CPU, a memory device such as a RAM, a nonvolatile auxiliary storage device such as a ROM, I/O interface devices, and the like. The control device 210 performs various functions by, for example, loading a program installed in the auxiliary storage device onto the memory device and executing the program by the CPU.

For example, the control device 210 may perform processing of acquiring information received from the work machine 100 through the communication device 220, constructing a database, and predetermined processing to generate processing information.

The control device 210 also performs, for example, control related to remote operation of the work machine 100. The control device 210 may receive a signal of an input related to the remote operation of the work machine 100 received by the remote operation device, and transmit a remote operation signal representing the contents of the operation input, that is, the contents of the remote operation of the work machine 100 to the work machine 100 through the communication device 220.

The communication device 220 is connected to the communication line NW and communicates with the outside of the management device 200 (for example, the work machine 100).

The input device 230 receives an input by a manager, a worker, or the like of the management device 200, and outputs a signal representing the contents of the input (for example, an operation input, a voice input, a gesture input, or the like). A signal representing the contents of the input is received by the control device 210.

The input device 230 may include, for example, a remote operation device. Accordingly, the worker (operator) of the management device 200 can remotely operate the work machine 100 using the remote operation device.

The output device 240 outputs various kinds of information to the user of the management device 200.

The output device 240 includes, for example, a lighting device or a display device that outputs various types of visual information to the user of the management device 200. The lighting device includes, for example, a warning lamp or the like. The display device includes, for example, a liquid crystal display or an organic EL display. The output device 240 includes a sound output device that outputs various kinds of auditory information to the user of the management device 200. The sound output device includes, for example, a buzzer and a speaker.

The display device displays various information images related to the management device 200. The display device may include, for example, a remote operation display device or a display device for monitoring, and image information (peripheral image) of the periphery of the work machine 100 uploaded from the work machine 100 and the like may be displayed on the remote operation display device or the display device for monitoring, under the control of the control device 210. Thus, the user (operator) of the management device 200 can remotely operate the work machine 100 while ascertaining the image information of the periphery of the work machine 100 displayed on the remote operation display device. Furthermore, the user (monitoring person) of the management device 200 can monitor the work status of the work machine 100 while ascertaining the image information of the periphery of the work machine 100 that is fully automatically driven displayed on the display device for monitoring.

Specific Example of Setting Screen Related to Automatic Conveying Control

With reference to FIG. 8 to FIG. 11, specific examples of a setting screen related to automatic conveying control (hereinafter, referred to as "automatic conveying setting screen") will be described.

First Example of Automatic Conveying Setting Screen

Figure 8:
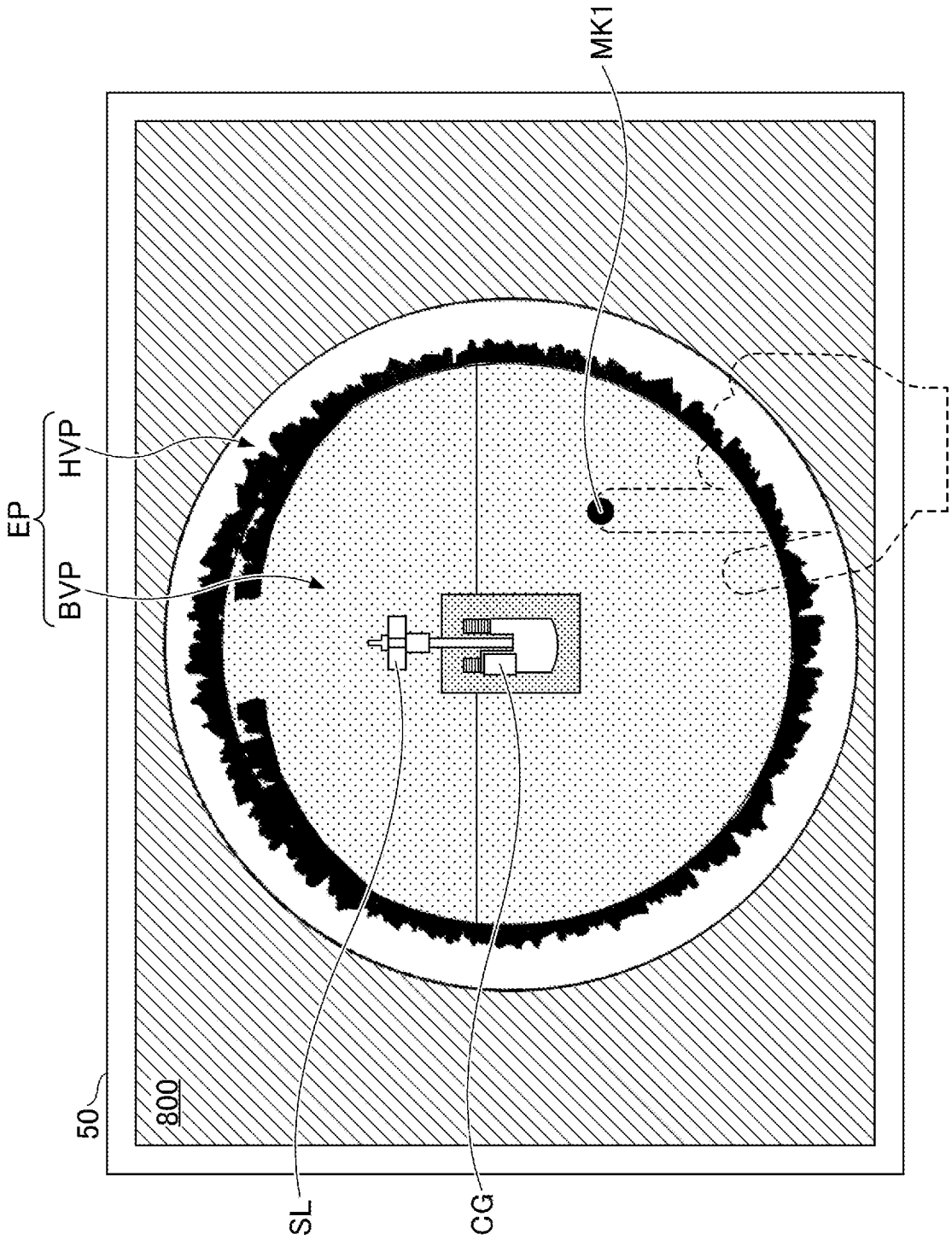
FIG. 8 is a diagram illustrating an example of an automatic conveying setting screen displayed on a display device of the shovel.

FIG. 8 is a diagram illustrating a first example of an automatic conveying setting screen displayed on the output device 50 (display device) of the work machine 100. Specifically, FIG. 8 is a diagram illustrating an example of an automatic conveying setting screen (automatic conveying setting screen 800) displayed on the output device 50 (display device) of the shovel 100A.

An automatic conveying setting screen similar to the automatic conveying setting screen 800 may be displayed on the output device 240 (for example, a remote operation display device or a display device for monitoring) of the management device 200.

As illustrated in FIG. 8, a viewpoint conversion image EP and a shovel image CG are displayed on the automatic conveying setting screen 800 under the control of the controller 30.

The viewpoint conversion image EP is composed of a combination of a bird's-eye view image BVP obtained by viewing a peripheral region adjacent to the shovel 100A from right above and a horizontal image HVP obtained by viewing the peripheral region from the shovel 100A in horizontal direction and arranged in such a manner as to surround the bird's-eye view image BVP. The viewpoint conversion image EP is generated based on the captured image of the imaging device S6 under the control of the controller 30. Specifically, the viewpoint conversion image EP is obtained by projecting a captured image of each camera included in the imaging device S6 onto a spatial model and then re-projecting the projected image projected onto the spatial model onto another two-dimensional plane. The spatial model is a projection subject of the captured image in the virtual space, and is constituted by one or more planes or curved surfaces including a plane or curved surface other than the plane on which the captured image is located.

Under the control of the controller 30, the output device 50 displays the generated viewpoint conversion image EP in such a manner as to surround the shovel image CG in accordance with the positional relationship viewed from the shovel 100A. Thus, the operator can ascertain the current situation in the area surrounding the shovel 100A.

In the present example, on the viewpoint conversion image EP, the suspended load SL slung on the hook HK is shown at a position that corresponds to the front position of the shovel image CG.

The operator can designate, through the input device 52, a position MK1 that is a specific position peripheral to the shovel 100A on the viewpoint conversion image EP displayed on the automatic conveying setting screen 800 as a conveying destination. In the present example, the operator designates, as the conveying destination of the suspended load SL, the position MK1 peripheral to the shovel 100A through a touch panel as the input device 52 implemented on the output device 50 (display device).

The conveying setting unit 301 sets the position MK1 designated through the input device 52 on the automatic conveying setting screen 800 as the conveying destination of the suspended load SL. Specifically, as the conveying destination of the suspended load SL, the conveying setting unit 301 sets the position MK1, peripheral to the crawler crane 100B, that corresponds to the designated point (pixel point) on the viewpoint conversion image EP.

Instead of or in addition to the viewpoint conversion image EP, the captured image (through-the-lens image) output of the imaging device S6 may be displayed as it is on the automatic conveying setting screen 800.

Second Example of Automatic Conveying Setting Screen

Figure 9:
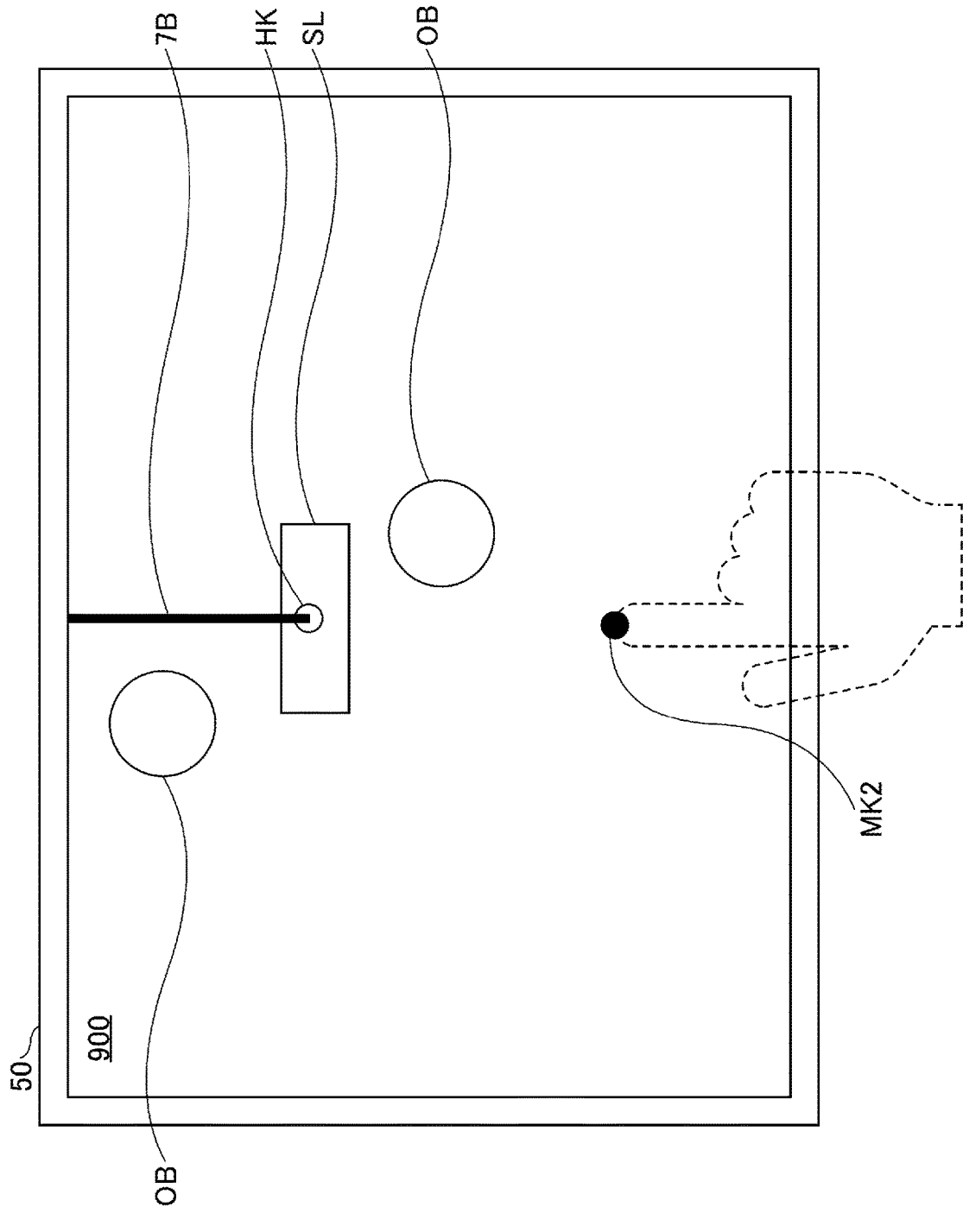
FIG. 9 is a diagram illustrating an example of an automatic conveying setting screen displayed on a display device of the crawler crane.

FIG. 9 is a diagram illustrating a second example of the automatic conveying setting screen displayed on the output device 50 (display device) of the work machine 100. Specifically, FIG. 9 is a diagram illustrating an example of an automatic conveying setting screen (automatic conveying setting screen 900) displayed on the output device 50 (display device) of the crawler crane 100B.

An automatic conveying setting screen similar to the automatic conveying setting screen 900 may be displayed on the output device 240 (for example, a remote operation display device or a display device for monitoring) of the management device 200.

As illustrated in FIG. 9, on the automatic conveying setting screen 900, a captured image (through-the-lens image) of the imaging device S6 (camera) attached to the boom 4B is displayed as it is, the hook HK and the suspended load SL being in the imaging range.

On the automatic conveying setting screen (captured image of the imaging device S6), a situation in which the suspended load SL placed between obstacles OB (see FIG. 3) is slung on the hook HK is shown.

The operator can designate, through the input device 52, a position MK2 that is a specific position around (in front of) the crawler crane 100B on the captured image displayed on the automatic conveying setting screen 900 as a conveying destination of the suspended load SL. In the present example, the operator designates, as the conveying destination of the suspended load SL, the position MK2 peripheral to the crawler crane 100B through a touch panel as the input device 52 implemented on the output device 50 (display device).

The conveying setting unit 301 sets the position MK2 designated through the input device 52 on the automatic conveying setting screen 900 as the conveying destination of the suspended load SL. Specifically, as the conveying destination of the suspended load SL, the conveying setting unit 301 sets the position MK2, on the ground peripheral to the crawler crane 100B, corresponding to the designated point (pixel point) on the captured image.

Instead of or in addition to the through-the-lens image, a viewpoint conversion image similar to the case of FIG. 8 may be displayed on the automatic conveying setting screen 900. Hereinafter, the same may be applied to the case of an automatic conveying setting screen 1000 (FIG. 10) and an automatic conveying setting screen 1100 (FIG. 11).

Third Example of Automatic Conveying Setting Screen

Figure 10:
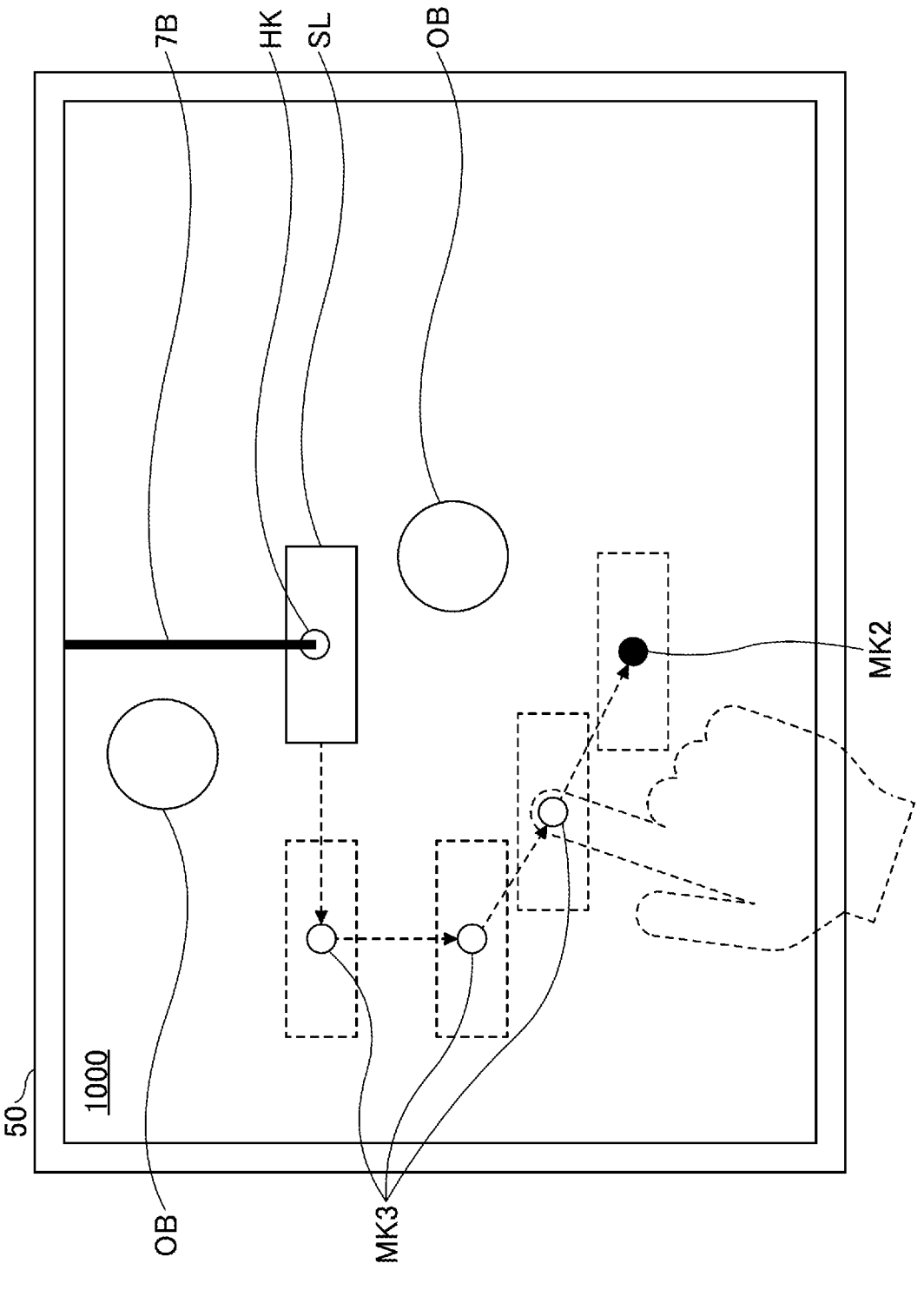
FIG. 10 is a diagram illustrating another example of the automatic conveying setting screen displayed on the display device of the crawler crane.

FIG. 10 is a diagram illustrating a third example of the automatic conveying setting screen displayed on the output device 50 (display device) of the work machine 100. Specifically, FIG. 10 is a diagram illustrating another example of the automatic conveying setting screen (automatic conveying setting screen 1000) displayed on the output device 50 (display device) of the crawler crane 100B.

An automatic conveying setting screen similar to the automatic conveying setting screen 1000 may be displayed on the output device 240 (for example, a remote operation display device or a display device for monitoring) of the management device 200.

As illustrated in FIG. 10, on the automatic conveying setting screen 1000, as in the case of FIG. 9, a captured image (through-the-lens image) of the imaging device S6 (camera) attached to the boom 4B is displayed as it is, the hook HK and the suspended load SL being in the imaging range.

On the automatic conveying setting screen 1000 (captured image of the imaging device S6), as in the case of FIG. 9, a situation in which the suspended load SL placed between the obstacles OB is slung on the hook HK is shown.

As in the case of FIG. 9, the operator can designate, through the input device 52, a position MK2 that is a specific position around (in front of) the crawler crane 100B on the captured image displayed on the automatic conveying setting screen 1000 as the conveying destination of the suspended load SL.

Furthermore, the operator can designate one or more of positions MK3 (three in the present example) of the waypoints through which the suspended load SL passes during the automatic conveyance. In the present example, the operator designates, through the touch panel as the input device 52 implemented on the output device 50 (display device), the three positions MK3 of the waypoints as the conveying paths of the suspended load SL, in such a manner as to avoid the obstacle OB in front of the crawler crane 100B. As a result, the operator can designate the conveying path by which collision with the obstacle OB can be avoided.

As in the case of FIG. 9, the conveying setting unit 301 sets the position MK2 designated on the automatic conveying setting screen 1000 as the conveying destination of the suspended load SL. The conveying setting unit 301 also sets the conveying path of the suspended load SL to the conveying destination based on the positions MK3 of the waypoints designated on the automatic conveying setting screen 1000. For example, the conveying setting unit 301 sets the conveying path of the suspended load SL to the conveying destination so as to pass right above the positions MK3, on the ground peripheral to the crawler crane 100B, corresponding to the designated points (pixel points) on the captured image.

As in the case of the present example, the configuration can be modified such that the positions of the waypoints can also be designated on the automatic conveying setting screen 800 (FIG. 8) displayed on the output device 50 (display device) of the shovel 100A.

Fourth Example of Automatic Conveying Setting Screen

Figure 11:
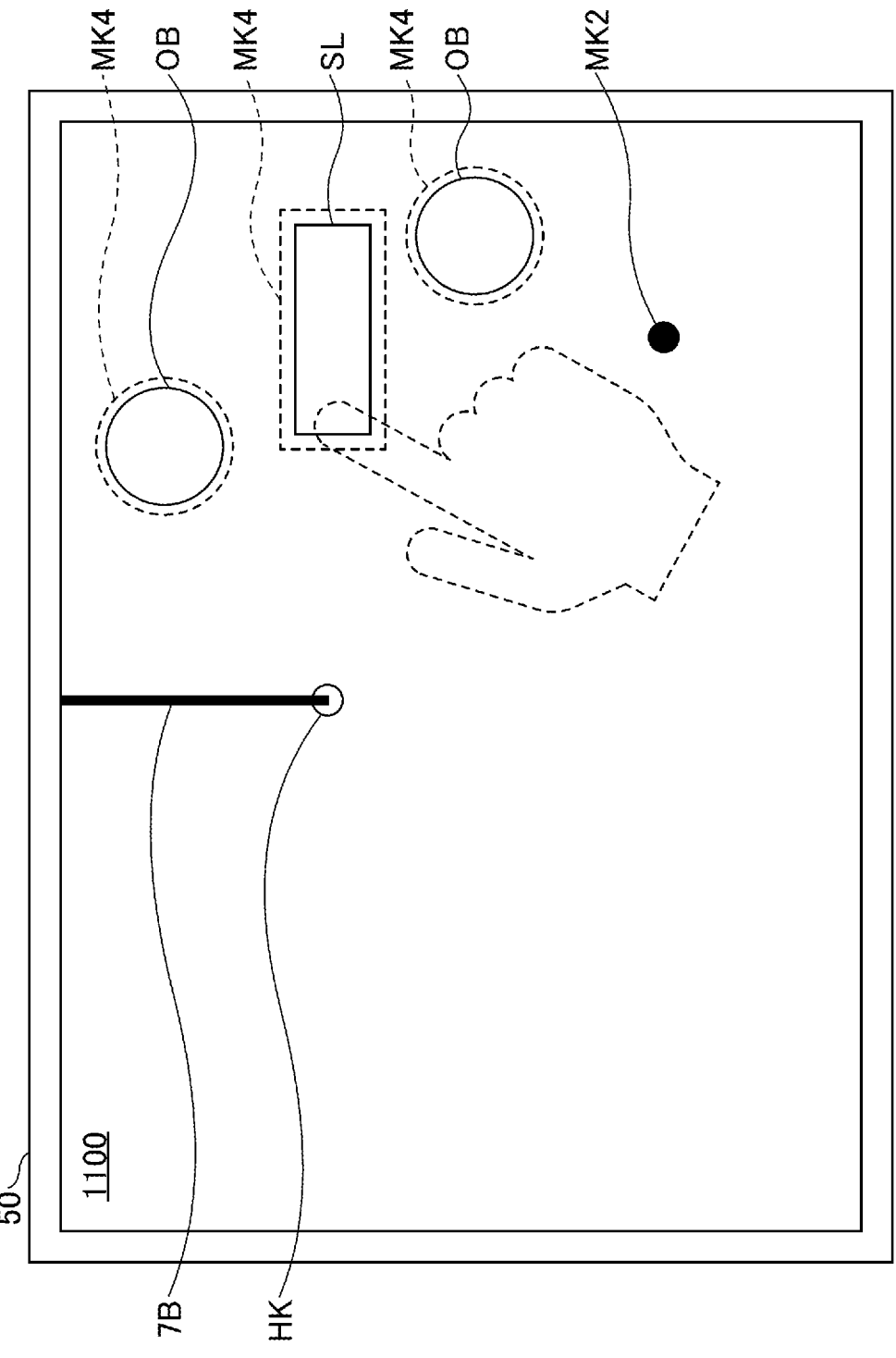
FIG. 11 is a diagram illustrating still another example of the automatic conveying setting screen displayed on the display device of the crawler crane.

FIG. 11 is a diagram illustrating a fourth example of the automatic conveying setting screen displayed on the output device 50 (display device) of the work machine 100. Specifically, FIG. 11 is a diagram illustrating still another example (automatic conveying setting screen 1100) of the automatic conveying setting screen displayed on the output device 50 (display device) of the crawler crane 100B.

An automatic conveying setting screen similar to the automatic conveying setting screen 1100 may be displayed on the output device 240 (for example, a remote operation display device or a display device for monitoring) of the management device 200.

As illustrated in FIG. 11, on the automatic conveying setting screen 1100, as in the case of FIG. 9, a captured image (through-the-lens image) of the imaging device S6 (camera) attached to the boom 4B is displayed as it is, the hook HK and the suspended load SL being in the imaging range.

Unlike the case of FIG. 9, the automatic conveying setting screen 1100 (captured image of the imaging device S6) shows s situation before the suspended load SL placed between the obstacles OB is slung on the hook HK.

Furthermore, unlike the case of FIG. 9, multiple markers MK4 representing candidates for the suspended load SL are displayed on the automatic conveying setting screen 1100.

Specifically, the markers MK4 representing a total of three candidates including the suspended load SL and two obstacles OB are displayed.

As in the case of FIG. 9, the operator can designate, through the input device 52, a position MK2 that is a specific position around (in front of) the crawler crane 100B on the captured image displayed on the automatic conveying setting screen 1100 as the conveying destination of the suspended load SL.

In addition, the operator can select and designate, through the input device 52, one marker MK4 corresponding to the suspended load SL from among the (three) markers MK4 displayed on the automatic conveying setting screen 1100. In the present example, the operator selects and designates the marker MK4 corresponding to the suspended load SL through a touch panel as the input device 52 implemented on the output device 50 (display device).

As in the case of FIG. 9, the conveying setting unit 301 sets the position MK2 designated on the automatic conveying setting screen 1100 as the conveying destination of the suspended load SL. The conveying setting unit 301 also sets an object corresponding to the marker MK4 selected and designated on the automatic conveying setting screen 1100 as the suspended load SL to be conveyed.

On the automatic conveying setting screen 1100, as in the case of FIG. 10, the configuration can be modified such that the positions MK3 of the waypoints of the suspended load SL can also be designated. Furthermore, as in the case of the present example, on the automatic conveying setting screen 800 (FIG. 8) displayed on the output device 50 (display device) of the shovel 100A, the configuration can be modified such that one candidate can be selected and designated as the suspended load SL to be conveyed from among one or more candidates for the suspended load SL before being suspended.

Details of Automatic Conveying Control

The automatic conveying control by the controller 30 will be described in detail with reference to FIG. 12 to FIG. 14.

Example of Automatic Conveying Control

Figure 12:
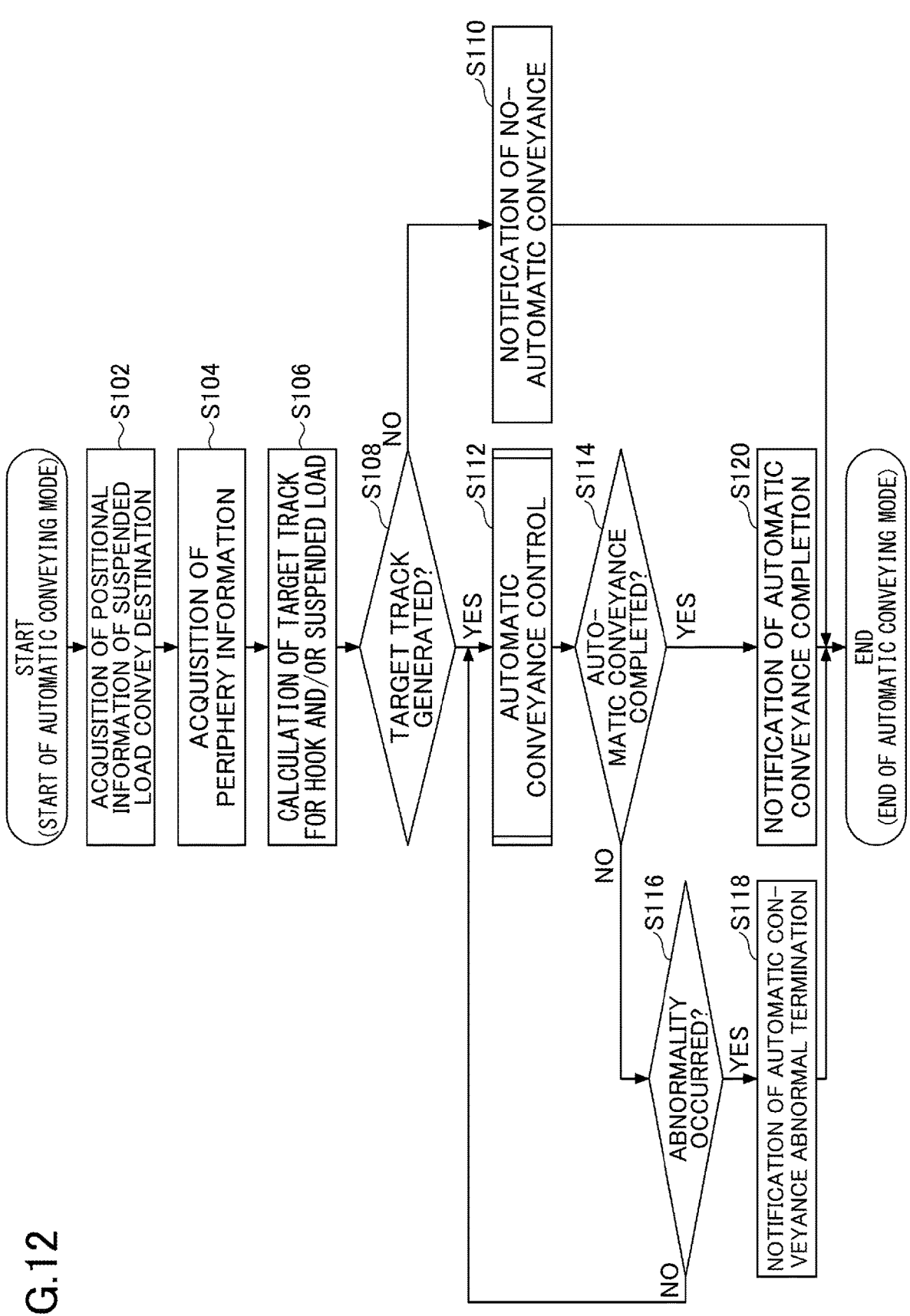
FIG. 12 is a flowchart schematically illustrating an example of automatic conveying control.

FIG. 12 is a flowchart schematically illustrating an example of automatic conveying control by the controller 30.

This flowchart is executed at the start of a control mode ("automatic conveying mode") of the controller 30 for performing automatic conveying control. The automatic conveying mode may be automatically started, for example, when various settings related to the automatic conveyance by the conveying setting unit 301 are completed. The automatic conveying mode may also be manually started by the user with a predetermined input through the input device 52 or the input device 230. Furthermore, the automatic conveying mode may be ended in response to the end of this flowchart. The same applies to the flowcharts illustrated in FIG. 13 and FIG. 14.

As illustrated in FIG. 12, in step S102, the automatic control unit 302 acquires the positional information of the conveying destination of the suspended load SL set by the conveying setting unit 301.

Upon completion of the process in step S102, the controller 30 proceeds to step S104.

In step S104, the automatic control unit 302 acquires information representing a situation in an area surrounding the work machine 100 from the imaging device S6, the distance sensor, or the like.

Upon completion of the process in step S104, the controller 30 proceeds to step S106.

In step S106, the automatic control unit 302 calculates a target track of the hook HK and the suspended load SL to the conveying destination based on the information acquired in steps S102 and S104.

Upon completion of the process in step S106, the controller 30 proceeds to step S108.

In step S108, the automatic control unit 302 determines whether or not the target track has been generated. For example, when the target track to the conveying destination of the suspended load SL cannot be generated due to the situation in the area surrounding the work machine 100, the limitation of the movable range of the work machine 100, or the like, the automatic control unit 302 proceeds to step S110. On the other hand, when the target track has been generated, the automatic control unit 302 proceeds to step S112.

In step S108, the automatic control unit 302 may determine whether or not an efficient target track has been generated under a predetermined criterion. The efficient target track under the predetermined criterion is, for example, a target track that connects an initial location and a conveying destination location of the suspended load SL with the shortest distance, that is, a target track that is a straight line connecting the initial location and the conveying destination location of the suspended load SL, in a top view of the work machine 100. The efficient target track under the predetermined criterion may be a target track in which the ratio of the movement distance of the suspended load SL to the conveying track connecting the initial location and the conveying destination location of the suspended load SL with the shortest distance is equal to or less than a predetermined threshold. Accordingly, for example, in a case where an operator or an obstacle is present between the initial location and the conveying destination location of the suspended load SL, it is possible to urge the user to move the operator or the other obstacle in step S110 described later. In a case where, for example, an operator or an obstacle is present between the initial location and the conveying destination location of the suspended load SL, for example, it is possible to urge the user to automatically convey the suspended load SL via a relay point. Therefore, it is possible to improve safety during the automatic conveyance by the work machine 100.

In step S110, the automatic controller 302 notifies the user that the automatic conveyance of the suspended load SL cannot be executed through the output device 50 (an example of a notifying device) or through the output device 240 by using the communication device 60 (an example of a notifying device).

In step S110, instead of or in addition to the notification that the automatic conveyance of the suspended load SL cannot be executed, the automatic control unit 302 may notify that the conveying path (target track) for the automatic conveyance of the suspended load SL cannot be generated. As described above, when it is determined in step S108 whether or not it is possible to generate an efficient target track under the predetermined criterion, the automatic control unit 302 may notify, in step S110, that the automatic conveyance cannot be executed from the viewpoint of safety due to the presence of an operator or other obstacles. In this case, in step S110, the automatic control unit 302 may also issue a notification urging the user to move the worker or the other obstacle or urging the user to automatically convey the suspended load SL via a relay point.

Upon completion of the process in step S110, the controller 30 ends the process of this flowchart.

In step S112, the automatic control unit 302 controls the hydraulic pressure control valve 31 based on the generated target track, and starts automatic conveying control for automatically conveying the suspended load SL suspended from the hook HK to the conveying destination.

Upon completion of the process in step S112, the controller 30 proceeds to step S114.

In step S114, the automatic control unit 302 determines whether or not the automatic conveyance of the suspended load SL to the conveying destination has been completed. When the automatic conveyance of the suspended load SL to the conveying destination is not completed, the automatic controller 302 proceeds to step S116. When the automatic conveyance of the suspended load SL to the conveying destination is completed, the automatic controller 302 proceeds to step S120.

In step S116, the automatic control unit 302 determines whether or not an abnormality has occurred during the automatic conveying control. When no abnormality occurs, the automatic control unit 302 returns to step S112 and continues the automatic conveying control. On the other hand, when an abnormality has occurred, the automatic control unit 302 proceeds to step S118.

In step S118, the automatic control unit 302 notifies the user of the end of the automatic conveyance of the suspended load SL due to the occurrence of the abnormality through the output device 50 or the output device 240.

Upon completion of the process in step S118, the controller 30 ends the process of the current flowchart.

In step S120, the automatic controller 302 notifies the user of the completion of the automatic conveyance of the suspended load SL through the output device 50 or the output device 240.

Upon completion of the process in step S120, the controller 30 ends the process of the current flowchart.

As described above, in the present example, the controller 30 causes at least one of the lower traveling body 1, the upper swing body 3, and the attachment AT to operate to automatically convey the suspended load SL to the conveying destination.

As a result, the controller 30 can support the crane work of the work machine 100 conveying the suspended load SL to the conveying destination as a whole. Therefore, in the work machine 100, it is possible to reduce the load of the crane work performed by the operator, to shorten the time of the crane work by the work machine 100, and to reduce the number of assistants (for example, route signaling personnel) and the like who engage in the crane work, and to improve work efficiency of the crane work.

Other Examples of Automatic Conveying Control

Figure 13:
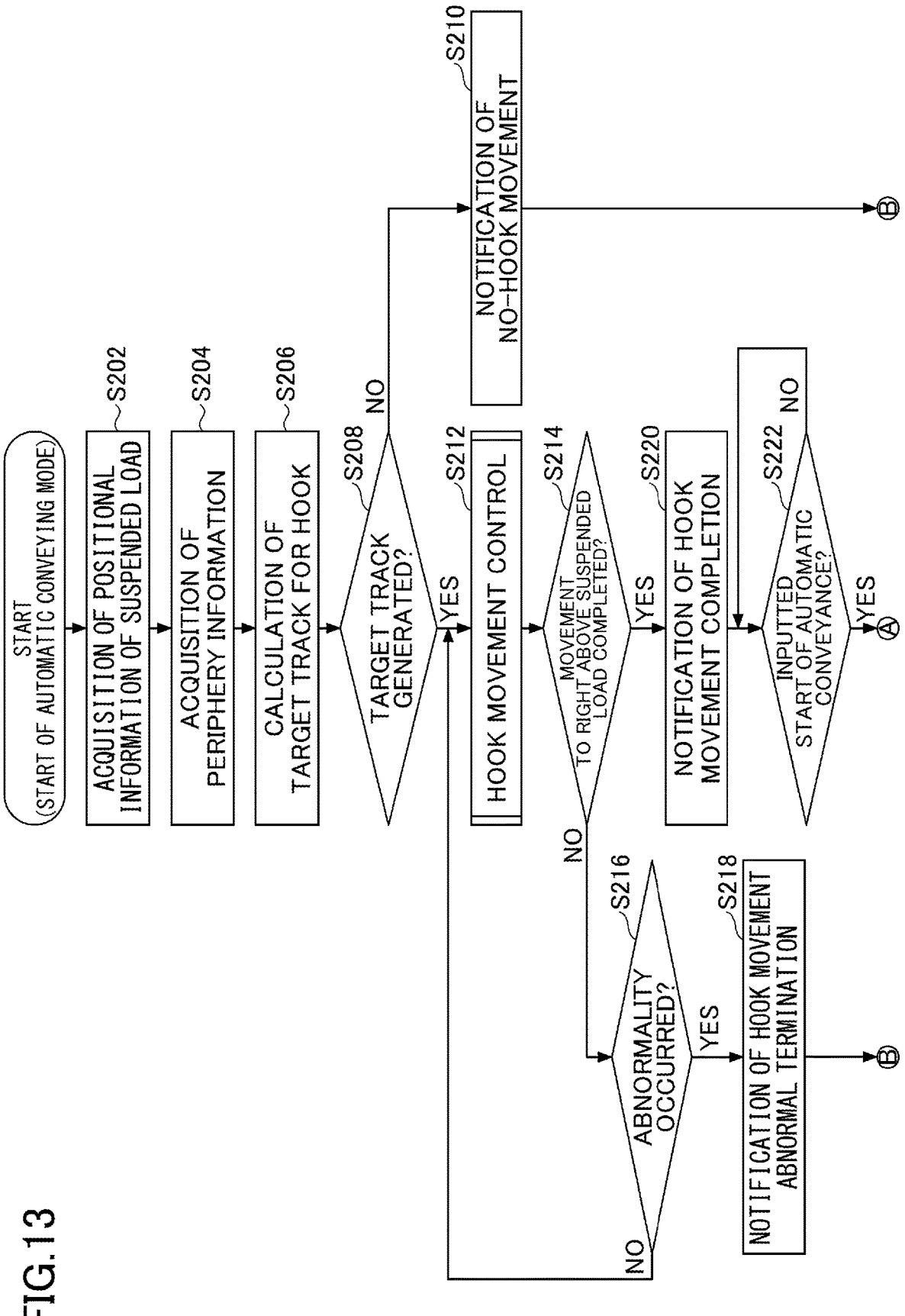
FIG. 13 is a flowchart schematically illustrating another example of automatic conveying control.
Figure 14:
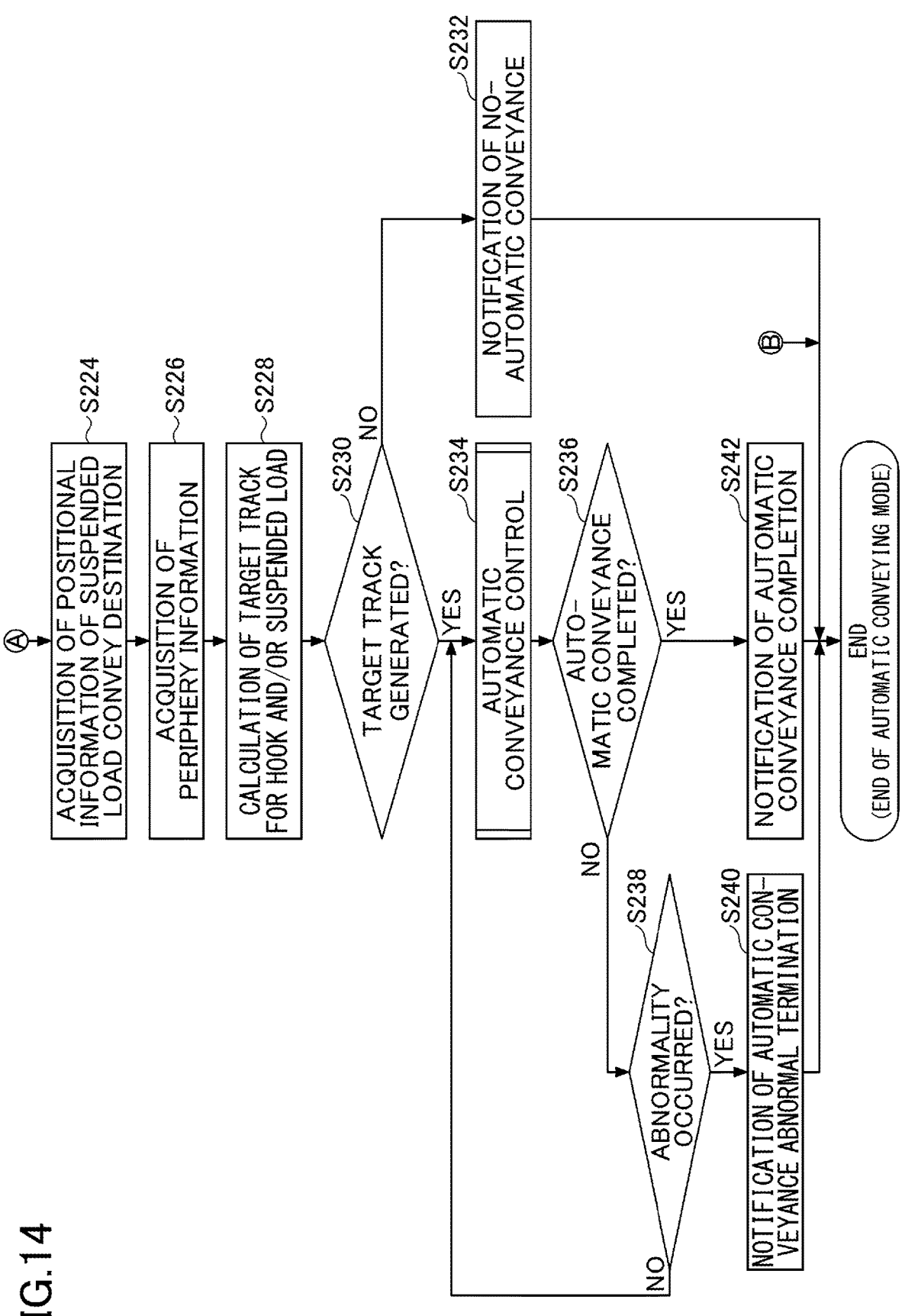
FIG. 14 is a flowchart schematically illustrating another example of automatic conveying control.

FIG. 13 and FIG. 14 are flowcharts schematically illustrating another example of the automatic conveying control by the controller 30.

As illustrated in FIG. 13, in step S202, the automatic controller 302 acquires the positional information of the suspended load SL which has been set as the subject to be conveyed by the conveying setting unit 301.

Upon completion of the process in step S202, the controller 30 proceeds to step S204.

In step S204, the automatic control unit 302 acquires information representing a situation in an area surrounding the work machine 100 from the imaging device S6, the distance sensor, or the like.

Upon completion of the process in step S204, the controller 30 proceeds to step S206.

In step S206, the automatic control unit 302 calculates a target track of the hook HK to a position right above the suspended load SL to be conveyed based on the information acquired in steps S202 and S204.

Upon completion of the process in step S206, the controller 30 proceeds to step S208.

In step S208, the automatic control unit 302 determines whether or not the target track has been generated. For example, in a case where the target track to the position right above the suspended load SL cannot be generated due to the situation in the area surrounding the work machine 100, the limitation of the movable range of the work machine 100, or the like, the automatic control unit 302 proceeds to step S210. On the other hand, when the target track has been generated, the automatic control unit 302 proceeds to step S212.

In step S210, the automatic control unit 302 notifies the user that the hook HK cannot be automatically moved to the position above the suspended load SL through the output device 50 or the output device 240.

Upon completion of the process in step S210, the controller 30 ends the process of the current flowchart.

In step S212, the automatic controller 302 controls the hydraulic pressure control valve 31 on the basis of the generated target track to start control for automatically moving the hook HK to the position right above the suspended load SL to be conveyed (hereinafter referred to as "hook movement control").

Upon completion of the process in step S212, the controller 30 proceeds to step S214.

In step S214, the automatic control unit 302 determines whether or not the movement of the hook HK to the position right above the suspended load SL has been completed. When the movement of the hook HK to the position right above the suspended load SL is not completed, the automatic control unit 302 proceeds to step S216, and when the movement of the hook HK to the position right above the suspended load SL is completed, the automatic control unit 302 proceeds to step S220.

In step S216, the automatic control unit 302 determines whether or not an abnormality has occurred during the hook movement control. If no abnormality has occurred, the automatic control unit 302 returns to step S212 and continues the hook movement control. On the other hand, when an abnormality has occurred, the automatic control unit 302 proceeds to step S218.

In step S218, the automatic control unit 302 notifies the user of the end of the movement of the hook HK to the position right above the suspended load SL due to the occurrence of the abnormality through the output device 50 or the output device 240.

Upon completion of the process in step S218, the controller 30 ends the process of the current flowchart.

In step S220, the automatic control unit 302 notifies the user of the completion of the movement of the hook HK to the position right above the suspended load SL through the output device 50 or the output device 240.

Upon completion of the process in step S220, the controller 30 proceeds to step S222.

In step S222, the automatic control unit 302 determines whether or not a predetermined input indicating the start of the automatic conveyance of the suspended load SL has been received through the input device 52 or the input device 230. For example, when the slinging work of the suspended load SL to the hook HK is completed, the user performs the predetermined input for instructing the start of the automatic conveyance of the suspended load SL through the input device 52 or the input device 230. When the predetermined input indicating the start of the automatic conveyance of the suspended load SL is received through the input device 52 or the input device 230, the automatic control unit 302 proceeds to step S224. When the predetermined input is not received, the automatic control unit 302 stands by until the predetermined input is received (repeats the processing of this step).

Whether to start the automatic conveyance may be automatically determined without depending on an input by the user. For example, the controller 30 (automatic control unit 302) may determine whether or not the slinging work has been completed using image recognition processing based on the output of the imaging device S6. In this case, in step S222, the automatic control unit 302 determines whether or not the slinging work has been completed using image recognition processing based on the output of the imaging device S6. Then, when the slinging work is completed, the automatic control unit 302 proceeds to step S224, and when the slinging work is not completed, the automatic control unit 302 stands by until the slinging work is completed (repeats the processing of this step). Furthermore, whether or not to start the automatic conveyance may be determined in consideration of both the input by the user and the image recognition processing based on the output of the imaging device S6. In this case, for example, between steps S220 and S222, the automatic control unit 302 determines whether or not the slinging work has been completed using image recognition processing based on the output of the imaging device S6. Then, when the slinging work is completed, the automatic control unit 302 proceeds to step S222, and when the slinging work is not completed, the automatic control unit 302 stands by until the slinging work is completed (repeats the processing of this step).

Since steps S224 to S242 are the same as steps S102 to S120 in FIG. 12, description thereof will be omitted.

As described above, in the present example, the controller 30 causes at least one of the lower traveling body 1, the upper swing body 3, and the attachment AT to operate to automatically move the hook HK to a position right above the suspended load SL when the suspended load SL is automatically conveyed. After the suspended load SL is suspended from the hook HK, the controller 30 causes at least one of the lower traveling body 1, the upper swing body 3, and the attachment AT to operate to automatically convey the suspended load SL to the conveying destination.

As a result, it is possible to further reduce the load of the crane work performed by of the operator, further shorten the time of the crane work of the work machine 100, and further improve the work efficiency of the crane work.

Modification and Changes

Although the embodiment has been described in detail above, the present disclosure is not limited to the specific embodiment, and various modifications and changes can be made within the scope of the gist described in the claims.

For example, in the above-described embodiment, the functions of the conveying setting unit 301 and the automatic control unit 302 may be transferred to the management device 200 (an example of an information processing device). In this case, the control device 210 of the management device 200 may perform various determinations regarding the automatic conveying control of the suspended load SL by receiving an information signal including various types of information from the work machine 100 through the communication device 220. Furthermore, the control device 210 may automatically cause at least one of the lower traveling body 1, the upper swing body 3, and the attachment AT to operate to achieve automatic conveying control by transmitting a control signal to the shovel 100A through the communication device 220.

For example, in the above-described embodiment and the like, instead of or in addition to the engine 11, the main pump 14 and the pilot pump 15 may be driven by another main power source (for example, an electric motor) or the like.

Furthermore, in the above-described embodiment and the like, the work machine 100 may be, for example, configured such that some of the driven elements are electrically driven. In other words, some of the hydraulic actuators that drive the work machine 100 may be replaced with electric actuators.

According to the above-described embodiment, it is possible to support the lifting work of the work machine such as the shovel that conveys the suspended load to the conveying destination as a whole.

What is claimed is:

1. A work machine comprising:
   a lower traveling body;
   an upper swing body swingably mounted on the lower traveling body;
   a work device attached to the upper swing body;
   a hook for suspending a load, the hook attached to a distal end of the work device;
   an acquisition device that acquires a destination of the load based on a position input by an operator;
   an imaging device attached to the upper swing body and configured to acquire image information related to a situation in an area in front of, behind, and beside the upper swing body, the situation including a state of the load; and
   a hardware processor configured to
      set the destination of the load based on the acquired destination, after the acquisition device acquires the destination,
      determine whether the load is conveyable to the destination by causing, among the lower traveling body, the upper swing body, and the work device, only the upper swing body, the work device, or a combination thereof to operate, and
      cause the work machine to automatically convey the load to the destination by causing only the upper swing body, the work device, or the combination thereof to operate in response to determining that the load is conveyable to the destination by causing only the upper swing body, the work device, or the combination thereof to operate.

2. The work machine according to claim 1, further comprising:
   a cabin in which an operator rides; and
   a display device installed in the cabin and configured to display a current situation in an area surrounding the work machine based on an output of the imaging device,
   wherein the acquisition device includes an input device installed in the cabin, the input device being configured to acquire the position by receiving an input from the operator on a screen displayed on the display device, the screen showing the current situation in the area surrounding the work machine, the input designating the destination.

3. The work machine according to claim 2, wherein the acquisition device is configured to acquire information on a conveying route by receiving an input from the operator on a screen displayed on the display device, the screen showing a current situation in an area surrounding the work machine.

4. The work machine according to claim 2, wherein the display device is configured to display an output image from the imaging device and a viewpoint-converted image generated based on the output image.

5. The work machine according to claim 1, wherein the acquisition device includes a communication device configured to receive the position from an external device that receives an input designating the destination from the operator, or a peripheral recognition device configured to acquire the information on the destination by recognizing the destination designated by a worker around the work machine.

6. The work machine according to claim 1, wherein
the hardware processor is configured to recognize an obstacle and generate a conveying path for the load to the destination in such a manner as to avoid the obstacle, based on an output of the imaging device, and
the hardware processor is configured to cause the work machine to automatically convey the load to the destination along the conveying path.

7. The work machine according to claim 6, further comprising:
a notification device,
wherein the hardware processor is configured to generate the conveying path that is efficient under a predetermined criterion, based on the output of the imaging device, and
wherein the notification device is configured to notify a user when the hardware processor is prevented from generating the conveying path that is efficient under the predetermined criterion.

8. The work machine according to claim 1, wherein
the acquisition device is configured to acquire information on a conveying path for the load to the destination, and
the hardware processor is configured to cause the work machine to automatically convey the load to the destination along the conveying path.

9. The work machine according to claim 8, wherein the information on the conveying path is designated with a plurality of waypoints to the destination.

10. The work machine according to claim 1, wherein the hardware processor is configured to cause the work machine to automatically convey the load to the destination in such a manner as to suppress swing of the load, based on an output of the imaging device.

11. The work machine according to claim 1, wherein
the work device includes a boom attached to the upper swing body, an arm attached to a distal end of the boom, and a bucket attached to a distal end of the arm, and
the hook is attached to the bucket in such a manner as to be storable in a predetermined space formed in the bucket.

12. The work machine according to claim 1, wherein
the work device includes a boom attached to the upper swing body, and a rope suspended from a distal end of the boom in a windable and unwindable manner, and
the hook is attached to a tip of the rope.

13. The work machine according to claim 1, wherein the hardware processor is configured to set a conveying path of the load to the destination in accordance with the conveying path input through an input device.

14. The work machine according to claim 13, wherein the conveying path input through the input device includes one or more positions of waypoints designated on a screen displayed on a display.

15. An information processing device comprising:
a communication device configured to:
communicate with a work machine including a lower traveling body, an upper swing body swingably mounted on the lower traveling body, a work device attached to the upper swing body, a hook for suspending a load, the hook attached to a distal end of the work device, and an imaging device configured to capture an image of a situation in an area in front of, behind, and beside the upper swing body, the situation including a state of the load, and
receive image information based on an output of the imaging device;
a display device configured to display a current situation in an area surrounding the work machine based on the image information received by the communication device;
an input device configured to receive, from an operator, a position designating a destination of the load; and
a hardware processor configured to:
set the destination of the load based on the received position, after the input device receives the position;
determine whether the load is conveyable to the destination by causing, among the lower traveling body, the upper swing body, and the work device, only the upper swing body, the work device, or a combination thereof to operate, and
cause the work machine to automatically convey the load to the destination by causing only the upper swing body, the work device, or the combination thereof to operate in response to determining that the load is conveyable to the destination by causing only the upper swing body, the work device, or the combination thereof to operate.

16. The information processing device according to claim 15, wherein the display device is configured to display an output image of the imaging device, and a viewpoint conversion image generated based on the output image, the viewpoint conversion image representing a view of a situation in an area surrounding the work machine from a predetermined viewpoint.

17. A work machine comprising:
a lower traveling body;
an upper swing body swingably mounted on the lower traveling body;
a work device attached to the upper swing body;
a hook for suspending a load; the hook attached to a distal end of the work device;
an acquisition device that acquires a destination of the load based on a position input by an operator;
an imaging device attached to the upper swing body and configured to acquire image information related to a situation in an area in front of, behind, and beside the upper swing body, the situation including a state of the load;
a cabin in which an operator rides; and
a display device installed in the cabin and configured to display a current situation in an area surrounding the work machine based on an output of the imaging device,
wherein the work machine sets the destination of the load based on the acquired destination, after the acquisition device acquires the destination;

wherein the work machine is configured to automatically convey the load to the destination by causing at least one of the lower traveling body, the upper swing body, and the work device to operate, wherein the acquisition device includes an input device installed in the cabin, the input device being configured to acquire the position by receiving an input from the operator on a screen displayed on the display device, the screen showing the current situation in the area surrounding the work machine, the input designating the destination, and wherein at least one candidate object of the load is extracted based on information output from the acquisition device, and the candidate object is displayed on a screen displayed on the display device, the screen showing a current situation in an area surrounding the work machine.

18. The work machine according to claim 17, wherein a candidate object is selected by the operator from among one or more candidate objects displayed on the display device, and the selected candidate object is automatically conveyed by the work machine.

\* \* \* \* \*